(12) United States Patent
Shimamoto et al.

(10) Patent No.: US 8,795,821 B2
(45) Date of Patent: Aug. 5, 2014

(54) INTERLAYER FOR LAMINATED GLASS AND LAMINATED GLASS

(75) Inventors: Michio Shimamoto, Osaka (JP); Shota Matsuda, Osaka (JP); Sinyul Yang, Osaka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 14/111,541

(22) PCT Filed: Mar. 27, 2012

(86) PCT No.: PCT/JP2012/057856
§ 371 (c)(1),
(2), (4) Date: Oct. 11, 2013

(87) PCT Pub. No.: WO2012/141002
PCT Pub. Date: Oct. 18, 2012

(65) Prior Publication Data
US 2014/0044941 A1    Feb. 13, 2014

(30) Foreign Application Priority Data
Apr. 14, 2011    (JP) .................................. 2011-090034

(51) Int. Cl.
*B32B 17/10*    (2006.01)
(52) U.S. Cl.
USPC ........... 428/213; 428/212; 428/436; 428/437; 428/524; 428/525
(58) Field of Classification Search
CPC .................. B32B 17/10036; B32B 17/10761; B32B 2250/03; B32B 2250/04; B32B 2250/05; B32B 2250/40
USPC .................. 428/212, 213, 436, 437, 524, 525
See application file for complete search history.

(56) References Cited

U.S. PATENT DOCUMENTS

2013/0183532 A1    7/2013    Shimamoto et al.

FOREIGN PATENT DOCUMENTS

| EP | 0 710 545 A1 | 5/1996 |
| JP | 7-277783 A | 10/1995 |

(Continued)

OTHER PUBLICATIONS

International Search Report for the Application No. PCT/JP2012/057856 mailed Jun. 19, 2012.

(Continued)

*Primary Examiner* — D. S. Nakarani
(74) *Attorney, Agent, or Firm* — Cheng Law Group, PLLC

(57) ABSTRACT

Provided is an interlayer for laminated glass which increases sound-insulating properties in a high frequency area in a laminate glass over a wide temperature range. An interlayer film for laminated glass of the present invention includes first, second, and third layers, wherein when a cloud point C1 is measured by using a first liquid containing 100 parts by weight of a first plasticizer and 8 parts by weight of a first polyvinyl acetal resin contained in the first layer, a cloud point C2 is measured by using a second liquid containing 100 parts by weight of a second plasticizer and 8 parts by weight of a second polyvinyl acetal resin contained in the second layer, and a cloud point C3 is measured by using a third liquid containing 100 parts by weight of a third plasticizer and 8 parts by weight of a third polyvinyl acetal resin contained in the third layer, the cloud point C1 is 10° C. or lower; the cloud point C2 is higher than the cloud point C1 by at least 5° C.; and the cloud point C3 is higher than the cloud point C1 by at least 50° C. and higher than the cloud point C2.

14 Claims, 2 Drawing Sheets

(56) References Cited

FOREIGN PATENT DOCUMENTS

| | | |
|---|---|---|
| JP | 9-40444 A | 2/1997 |
| JP | 2000-103653 A | 4/2000 |
| JP | 2002-326844 A | 11/2002 |
| JP | 2004-67427 A | 3/2004 |
| JP | 2006-248826 A | 9/2006 |
| JP | 2007-70200 A | 3/2007 |
| WO | WO-2012/043819 A1 | 4/2012 |

OTHER PUBLICATIONS

Written Opinion of the International Searching Authority (PCT/ISA/237) for Application No. PCT/JP2012/057856 mailed Oct. 24, 2013.

INTERLAYER FOR LAMINATED GLASS AND LAMINATED GLASS

TECHNICAL FIELD

The present invention relates to an interlayer film for laminated glass used in laminated glass for vehicles, buildings, or the like. More specifically, the present invention relates to an interlayer film for laminated glass which contains a polyvinyl acetal resin and a plasticizer, and a laminated glass using the interlayer film for laminated glass.

BACKGROUND ART

Laminated glasses scatter fewer pieces of broken glass when they are damaged by external impact, and thus are excellently safe. Therefore, such laminated glasses are widely used in vehicles, railway carriages, aircrafts, ships, buildings, and the like. The laminated glass is produced by interposing an interlayer film between a pair of glass plates.

In order to reduce the weight of a laminated glass, studies have recently been performed for making a laminated glass thin. A thinner laminated glass, however, has a reduced sound-insulating property. If a laminated glass with a reduced sound-insulating property is used for the windshield of a vehicle, its sound-insulating property is disadvantageously insufficient against sounds at a register of about 5,000 Hz, such as wind noise and driving sound of wipers.

Then, additional studies have been performed for increasing the sound-insulating property of a laminated glass by changing materials of an interlayer film.

Patent Document 1 discloses, as one example of an interlayer film for laminated glass, a sound-insulating layer containing 100 parts by weight of a polyvinyl acetal resin with an acetalization degree of 60 to 85 mol %, 0.001 to 1.0 part by weight of at least one metal salt selected from alkali metal salts and alkaline earth metal salts, and 30 parts by weight or more of a plasticizer. This sound-insulating layer can be used alone as an interlayer film, or can be laminated with another layer and used as a multilayer interlayer film.

RELATED ART DOCUMENT

Patent Document

Patent Document 1: JP 2007-070200 A

SUMMARY OF THE INVENTION

Problems to be Solved by the Invention

Recently, fueled vehicles including internal combustion engines are gradually substituted by electric vehicles including electric motors and hybrid electric vehicles including internal combustion engines and electric motors. Laminated glasses used in fueled vehicles including internal combustion engines are especially required to have sound-insulating properties in a comparatively low frequency range. It is still preferred that such laminated glasses used in fueled vehicles including internal combustion engines have excellent sound-insulating properties also in a high frequency range. In contrast, laminated glasses used in electric vehicles and hybrid electric vehicles including electric motors are especially required to have sound-insulating properties in a high frequency range for effective insulation of drive noises of electric motors.

When the interlayer film disclosed in Patent Document 1 is used to produce a laminated glass, the laminated glass has an insufficient sound-insulating property in a high frequency range, which may unavoidably lead to reduction in the sound-insulating property due to a coincidence effect. In particular, such a laminated glass has a sound-insulating property that is high at specific temperatures but is not likely to be sufficiently high over a wide temperature range. Moreover, the laminated glass may not have a sufficient sound-insulating property at around 20° C.

Here, the coincidence effect is a phenomenon that, when sound waves strike a glass plate, the transverse wave is propagated on the glass surface due to the rigidity and inertia of the glass plate, and then the transverse wave resonates with the incident sound, so that the sound is transmitted.

The present invention aims to provide an interlayer film for laminated glass which can enhance, when used in a laminated glass, the sound-insulating property of the laminated glass in a high frequency range over a wide temperature range, and a laminated glass using the interlayer film for laminated glass.

Means for Solving the Problems

According to a broad aspect of the present invention, provided is an interlayer film for laminated glass including: a first layer containing a first polyvinyl acetal resin and a first plasticizer; a second layer containing a second polyvinyl acetal resin and a second plasticizer; and a third layer containing a third polyvinyl acetal resin and a third plasticizer, wherein, when a cloud point $C1$ is measured by using a first liquid containing 8 parts by weight of the first polyvinyl acetal resin dissolved in 100 parts by weight of the first plasticizer, a cloud point $C2$ is measured by using a second liquid containing 8 parts by weight of the second polyvinyl acetal resin dissolved in 100 parts by weight of the second plasticizer, and a cloud point $C3$ is measured by using a third liquid containing 8 parts by weight of the third polyvinyl acetal resin dissolved in 100 parts by weight of the third plasticizer, the cloud point $C1$ is 10° C. or lower; the cloud point $C2$ is higher than the cloud point $C1$ by at least 5° C.; and the cloud point $C3$ is higher than the cloud point $C1$ by at least 50° C. and higher than the cloud point $C2$.

According to a specific aspect of the interlayer film for laminated glass of the present invention, an acetylation degree of the first polyvinyl acetal resin is higher than an acetylation degree of the second polyvinyl acetal resin and an acetylation degree of the third polyvinyl acetal resin.

According to a specific aspect of the interlayer film for laminated glass of the present invention, an acetylation degree of the third polyvinyl acetal resin is lower than an acetylation degree of the first polyvinyl acetal resin and an acetylation degree of the second polyvinyl acetal resin.

According to a specific aspect of the interlayer film for laminated glass of the present invention, an acetylation degree of the first polyvinyl acetal resin is not lower than 15 mol %, an acetylation degree of the second polyvinyl acetal resin is not lower than 5 mol % but lower than 15 mol %, and an acetylation degree of the third polyvinyl acetal resin is lower than 5 mol %.

According to a specific aspect of the interlayer film for laminated glass of the present invention, the amount of all the plasticizers contained in the interlayer film for laminated glass is 30 parts by weight or more and 50 parts by weight or less based on 100 parts by weight of all the polyvinyl acetal resins contained in the interlayer film for laminated glass.

According to a specific aspect of the interlayer film for laminated glass of the present invention, the first layer, the second layer, and the third layer are stacked to form a laminated structure, and the layers are stacked in the order of the first layer, the second layer, and the third layer, the layers are stacked in the order of the second layer, the first layer, and the third layer, or the layers are stacked in the order of the first layer, the third layer, and the second layer.

According to a specific aspect of the interlayer film for laminated glass of the present invention, the layers are stacked in the order of the first layer, the second layer, and the third layer.

In the interlayer film for laminated glass of the present invention, a peak temperature of tan δ which appears at the lowest temperature measured at a frequency of 1 Hz is preferably 0° C. or lower. Moreover, in the interlayer film for laminated glass of the present invention, a maximum value of tan δ at a peak temperature of tan δ measured at a frequency of 1 Hz which appears at the lowest temperature is preferably 0.8 or more.

According to a specific aspect of the interlayer film for laminated glass of the present invention, when a thickness (mm) of the interlayer film for laminated glass is T, a total thickness (mm) of the first layer and the second layer is 0.05T or more and 0.4T or less.

According to a specific aspect of the interlayer film for laminated glass of the present invention, the interlayer film further includes a fourth layer containing a fourth polyvinyl acetal resin and a fourth plasticizer, and when a cloud point C4 is measured by using a fourth liquid containing 8 parts by weight of the fourth polyvinyl acetal resin dissolved in 100 parts by weight of the fourth plasticizer, the cloud point C4 is higher than the cloud point C1 by at least 50° C. and higher than the cloud point C2.

According to a specific aspect of the interlayer film for laminated glass of the present invention, the layers are stacked in the order of the fourth layer, the first layer, the second layer, and the third layer.

According to a specific aspect of the interlayer film for laminated glass of the present invention, a ratio of a total thickness of the first layer and the second layer to the total thickness of the third layer and the fourth layer is 0.1 or more and 0.5 or less.

A laminated glass of the present invention a first component for laminated glass; a second component for laminated glass; and an interlayer film sandwiched between the first component for laminated glass and the second component for laminated glass, and the interlayer film is an interlayer film for laminated glass prepared in accordance with the present invention.

Effect of the Invention

The interlayer film for laminated glass according to the present invention includes a first layer, a second layer, and a third layer respectively containing a polyvinyl acetal resin and a plasticizer, and has a laminated structure in which the first layer, the second layer, and the third layer are stacked. In addition, the cloud point C1 is 10° C. or lower, the cloud point C2 is higher than the cloud point C1 by at least 5° C., and the cloud point C3 is higher than the cloud point C1 by at least 50° C. and higher than the cloud point C2. Accordingly, the laminated glass including the interlayer film for laminated glass according to the present invention can have a better sound-insulating property in a high frequency range over a wide temperature range.

MODE(S) FOR CARRYING OUT THE INVENTION

Figure 1:
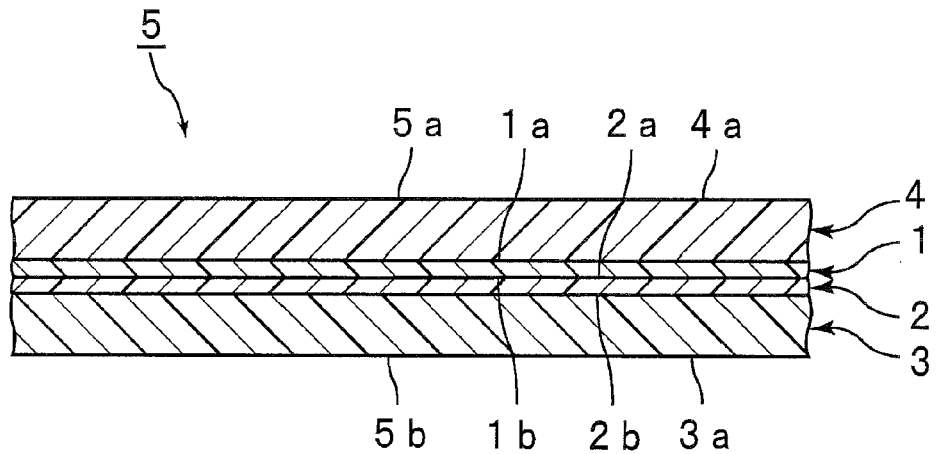
FIG. 1 is a partially cutaway cross-sectional view schematically illustrating an interlayer film for laminated glass according to a first embodiment of the present invention.

The following will specifically discuss the present invention.

The interlayer film for laminated glass according to the present invention includes a first layer, a second layer, and a third layer. The interlayer film for laminated glass according to the present invention preferably has a laminated structure including at least three layers. The interlayer film for laminated glass according to the present invention preferably has a laminated structure in which a first layer, a second layer, and a third layer are stacked. In this case, the order of stacking the first layer, the second layer, and the third layer is not particularly limited in the interlayer film for laminated glass according to the present invention. In the interlayer film for laminated glass according to the present invention, the first layer, the second layer, and the third layer are randomly stacked without regard to the order. Effects of the present invention can be achieved regardless of the order of stacking the first layer, the second layer, and the third layer.

The interlayer film for laminated glass according to the present invention may have a laminated structure (first layer/second layer/third layer) in which the layers are stacked in the order of the first layer, the second layer, and the third layer; a laminated structure (second layer/first layer/third layer) in which the layers are stacked in the order of the second layer, the first layer, and the third layer; or a laminated structure (first layer/third layer/second layer) in which the layers are stacked in the order of the first layer, the third layer, and the second layer. In particular, the interlayer film for laminated glass according to the present invention preferably has the laminated structure (first layer/second layer/third layer) in which the layers are stacked in the order of the first layer, the second layer, and the third layer or the laminated structure (second layer/first layer/third layer) in which the layers are stacked in the order of the second layer, the first layer, and the third layer. The interlayer film for laminated glass according to the present invention more preferably has the laminated structure (first layer/second layer/third layer) in which the layers are stacked in the order of the first layer, the second layer, and the third layer.

Preferably, the interlayer film for laminated glass according to the present invention further has a fourth layer. In this case, the interlayer film for laminated glass according to the present invention preferably has a laminated structure in which the first layer, the second layer, the third layer, and the fourth layer are stacked. Here, the order of stacking the first layer, the second layer, the third layer, and the fourth layer are not particularly limited. In the case where the interlayer film for laminated glass according to the present invention further has a fourth layer, the interlayer film preferably has a laminated structure (fourth layer/first layer/second layer/third layer) in which the layers are stacked in the order of the fourth layer, the first layer, the second layer, and the third layer. The interlayer film for laminated glass according to the present invention does not necessarily have a fourth layer.

In the following, the present invention is described with reference to drawings based on specific embodiments and examples of the present invention.

FIG. 1 is a partially cutaway cross-sectional view schematically illustrating an interlayer film for laminated glass according to a first embodiment of the present invention.

An interlayer film 5 in FIG. 1 is a multilayer interlayer film having a laminated structure including four layers. The interlayer film 5 is used in production of laminated glass. The interlayer film 5 is an interlayer film for laminated glass. The interlayer film 5 includes a first layer 1, a second layer 2, a third layer 3, and a fourth layer 4. The interlayer film 5 has a laminated structure in which the layers are stacked in the order of the fourth layer 4, the first layer 1, the second layer 2, and the third layer 3. The fourth layer 4 is on a first surface 1a of the first layer 1, and the second layer 2 is on a second surface 1b that is the opposite face of the first surface 1a. The first layer 1 is on a first surface 2a of the second layer 2 and the third layer 3 is on a second surface 2b that is the opposite face of the first surface 2a. The first layer 1 and the second layer 2 are intermediate layers and mainly serve as sound-insulating layers. The third layer 3 and the fourth layer 4 are protective layers and serve as surface layers in the present embodiment. The first layer 1 is sandwiched between the fourth layer 4 and the second layer 2 and positioned between the fourth layer 4 and the third layer 3. The second layer 2 is sandwiched between the first layer 1 and the third layer 3 and positioned between the fourth layer 4 and the third layer 3. The interlayer film 5 does not necessarily have the fourth layer 4.

Figure 2:
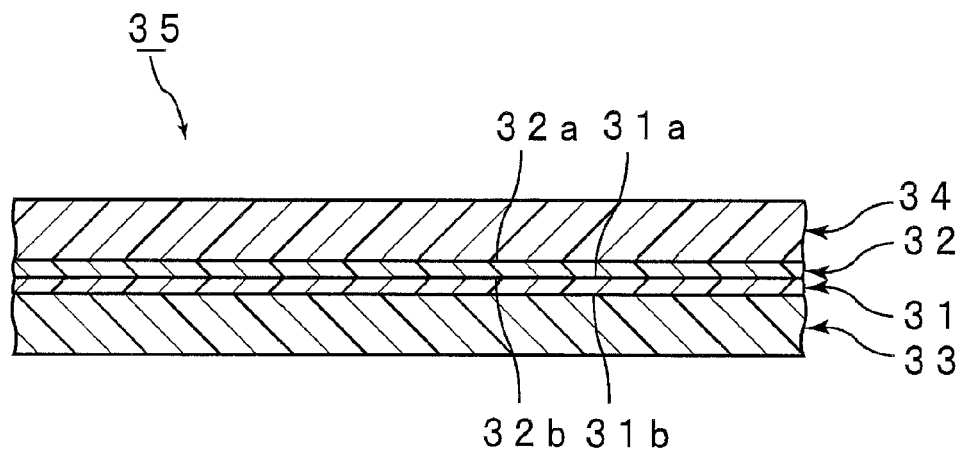
FIG. 2 is a partially cutaway cross-sectional view schematically illustrating an interlayer film for laminated glass according to a second embodiment of the present invention.

FIG. 2 is a cross-sectional view schematically illustrating an interlayer film for laminated glass according to a second embodiment of the present invention.

An interlayer film 35 in FIG. 2 is a multilayer interlayer film having a laminated structure including four layers. The interlayer film 35 is used in production of laminated glass. The interlayer film 35 is an interlayer film for laminated glass. The interlayer film 35 includes a first layer 31, a second layer 32, a third layer 33, and a fourth layer 34. The interlayer film 35 has a laminated structure in which the layers are stacked in the order of the fourth layer 34, the second layer 32, the first layer 31, and the third layer 33. The fourth layer 34 is on a first surface 32a of the second layer 32, and the first layer 31 is on a second surface 32b that is the opposite face of the first surface 32a. The second layer 32 is on a first surface 31a of the first layer 31, and the third layer 33 is on the second surface 31b that is the opposite face of the first surface 31a. The first layer 31 and the second layer 32 are intermediate layers and mainly serve as sound-insulating layers. The third layer 33 and the fourth layer 34 are protective layers and serve as surface layers in the present embodiment. The second layer 32 is sandwiched between the fourth layer 34 and the first layer 31, and is positioned between the fourth layer 34 and the third layer 33. The first layer 31 is sandwiched between the second layer 32 and the third layer 33, and is positioned between the fourth layer 34 and the third layer 33. The interlayer film 35 does not necessarily have the fourth layer 34.

Figure 3:
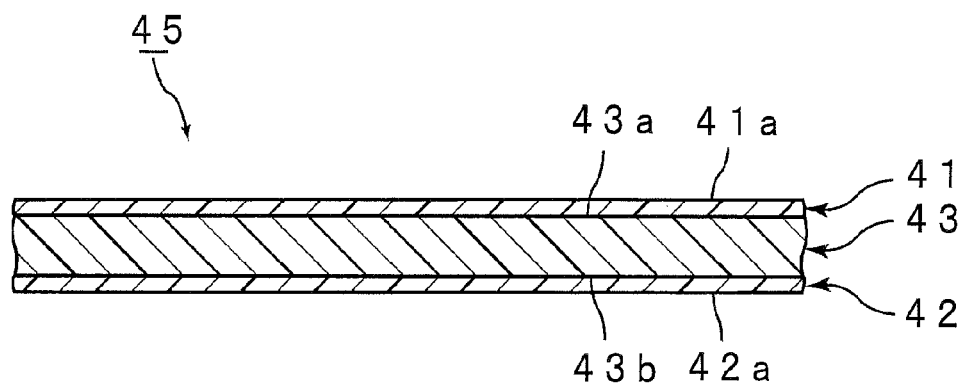
FIG. 3 is a partially cutaway cross-sectional view schematically illustrating an interlayer film for laminated glass according to a third embodiment of the present invention.

An interlayer film 45 in FIG. 3 is a multilayer interlayer film having a laminated structure including three layers. The interlayer film 45 is used in production of laminated glass. The interlayer film 45 is an interlayer film for laminated glass. The interlayer film 45 includes a first layer 41, a second layer 42, and a third layer 43. The interlayer film 45 has a laminated structure in which the layers are stacked in the order of the first layer 41, the third layer 43, and the second layer 42. The first layer 41 is on a first surface 43a of the third layer 43 and the second layer 42 is on a second surface 43b that is the opposite face of the first surface 43a. The third layer 43 is an intermediate layer. The first layer 41 and the second layer 42 mainly serve as sound-insulating layers and protective layers, and are surface layers in the present embodiment. The third layer 43 is sandwiched between the first layer 41 and the second layer 42. The interlayer film 45 may further have a fourth layer. In such a case, the fourth layer may be on a surface 41a that is the outer face of the first layer 41 or may be on a surface 42a that is the outer face of the second layer 42. Moreover, the interlayer film 45 may further have a fourth layer and a fifth layer. In such a case, the fourth layer may be on the surface 41a that is the outer face of the first layer 41 and the fifth layer may be on the surface 42a that is the outer face of the second layer 42.

The first layer contains a first polyvinyl acetal resin and a first plasticizer. The second layer contains a second polyvinyl acetal resin and a second plasticizer. The third layer contains a third polyvinyl acetal resin and a third plasticizer. The fourth layer contains a fourth polyvinyl acetal resin and a fourth plasticizer. The fifth layer contains a fifth polyvinyl acetal resin and a fifth plasticizer. A composition of the first layer is different from those of the second layer and the third layer. A composition of the first layer is preferably different from that of the fourth layer and is preferably different from that of the fifth layer. A composition of the second layer is different from those of the first layer and the third layer. A composition of the second layer is preferably different from that of the fourth layer and is preferably different from that of the fifth layer. A composition of the third layer and compositions of the fourth and the fifth layers may be the same as or different from each other. The first layer, the second layer, the third layer, the fourth layer, and the fifth layer respectively containing the first polyvinyl acetal resin, the second polyvinyl acetal resin, the third polyvinyl acetal resin, the fourth polyvinyl acetal resin, and the fifth polyvinyl acetal resin, respectively, can sufficiently enhance adhesion between the layers and between the layer and the component for laminated glass. Additionally, since surface layer(s) of an interlayer film contains a polyvinyl acetal resin, adhesion between the interlayer film and the component for laminated glass can be sufficiently enhanced. In the case of the interlayer film 5, for example, since the third layer 3 and the fourth layer 4 respectively contains the third polyvinyl acetal resin and the fourth polyvinyl acetal resin, adhesion between the third layer 3 and the fourth layer 4 and the component for laminated glass can be sufficiently enhanced.

Here, a cloud point C1 is measured by using a first liquid containing 8 parts by weight of the first polyvinyl acetal resin dissolved in 100 parts by weight of the first plasticizer in the first layer. A cloud point C2 is measured by using a second liquid containing 8 parts by weight of the second polyvinyl acetal resin dissolved in 100 parts by weight of the second plasticizer in the second layer. A cloud point C3 is measured by using a third liquid containing 8 parts by weight of the third polyvinyl acetal resin dissolved in 100 parts by weight of the third plasticizer in the third layer. A cloud point C4 is measured by using a fourth liquid containing 8 parts by weight of the fourth polyvinyl acetal resin dissolved in 100 parts by weight of the fourth plasticizer in the fourth layer. A cloud point C5 is measured by using a fifth liquid containing 8 parts by weight of the fifth polyvinyl acetal resin dissolved in 100 parts by weight of the fifth plasticizer in the fifth layer.

In other words, each of the first polyvinyl acetal resin and the first plasticizer contained in the first layer is a first polyvinyl acetal resin and a first plasticizer which give a cloud point of C1, provided that the cloud point is measured by using the first liquid containing 8 parts by weight of the first polyvinyl acetal resin dissolved in 100 parts by weight of the first plasticizer. Each of the second polyvinyl acetal resin and the second plasticizer in the second layer is a second polyvinyl acetal resin and a second plasticizer which give a cloud point of C2, provided that the cloud point is measured by using the second liquid containing 8 parts by weight of the second polyvinyl acetal resin dissolved in 100 parts by weight of the second plasticizer. Each of the third polyvinyl acetal resin and the third plasticizer in the third layer is a third polyvinyl acetal resin and a third plasticizer which give a cloud point of C3, provided that the cloud point is measured by using the third liquid containing 8 parts by weight of the third polyvinyl acetal resin dissolved in 100 parts by weight of the third plasticizer. Each of the fourth polyvinyl acetal resin and the fourth plasticizer in the fourth layer is a fourth polyvinyl acetal resin and a fourth plasticizer which give a cloud point of C4, provided that the cloud point is measured by using the fourth liquid containing 8 parts by weight of the fourth polyvinyl acetal resin dissolved in 100 parts by weight of the fourth plasticizer. Each of the fifth polyvinyl acetal resin and the fifth plasticizer in the fifth layer is a fifth polyvinyl acetal resin and a fifth plasticizer which give a cloud point of C5, provided that the cloud point is measured by using the fifth liquid containing 8 parts by weight of the fifth polyvinyl acetal resin dissolved in 100 parts by weight of the fifth plasticizer.

The present invention is mainly characterized in that the first layer, the second layer, and the third layer each contain the first polyvinyl acetal resin, the second polyvinyl acetal resin, and the third polyvinyl acetal resin and the first plasticizer, the second plasticizer, and the third plasticizer, respectively; that these first layer, second layer, and third layer are stacked and that the cloud point C1 is 10° C. or lower, the cloud point C2 is higher than the cloud point C1 by at least 5° C., and the cloud point C3 is higher than the cloud point C1 by at least 50° C. and higher than the cloud point C2. In other words, in the interlayer film for laminated glass according to the present invention, the first polyvinyl acetal resin, the second polyvinyl acetal resin, and the third polyvinyl acetal resin and the first plasticizer, the second plasticizer, and the third plasticizer in the first layer, the second layer, and the third layer are selected such that the cloud point C1 is 10° C. or lower, that the cloud point C2 is higher than the cloud point C1 by at least 5° C., and that the cloud point C3 is higher than the cloud point C1 by at least 50° C. and higher than the cloud point C2. Thus, the sound-insulating property of the laminated glass including the interlayer film can be enhanced in a high frequency range over a wide temperature range. Especially, the sound-insulating property in a high frequency range exceeding 3 kHz is effectively enhanced.

When the layers are stacked in the order of the first layer, the second layer, and the third layer, the interlayer film for laminated glass according to the present invention preferably further includes the fourth layer that is on the outer surface of the first layer and contains the fourth polyvinyl acetal resin and the fourth plasticizer. When the layers are stacked in the order of the second layer, the first layer, and the third layer, the interlayer film for laminated glass according to the present invention preferably further includes the fourth layer that is on the outer surface of the second layer and contains the fourth polyvinyl acetal resin and the fourth plasticizer. The cloud point C4 is preferably higher than the cloud point C1 by at least 50° C. and higher than the cloud point C2. The cloud point C4 and the cloud point C3 may be the same as or different from each other. The interlayer film including the fourth layer in addition to the first layer, the second layer, and the third layer further enhances the sound-insulating property of a laminated glass using the interlayer film in a high frequency range over a wide temperature range. Moreover, presence of the third layer and the fourth layer as the surface layers enhances the handleability of the interlayer film.

When the layers are stacked in the order of the first layer, the third layer, and the second layer, the interlayer film for laminated glass according to the present invention preferably further includes: the fourth layer that is on the outer surface of the first layer and contains the fourth polyvinyl acetal resin and the fourth plasticizer; and the fifth layer that is on the outer surface of the second layer and contains the fifth polyvinyl acetal resin and fifth plasticizer.

Preferably, the cloud point C4 is higher than the cloud point C1 by at least 50° C. and higher than the cloud point C2, and the cloud point C5 is higher than the cloud point C1 by at least 50° C. and higher than the cloud point C2. The cloud point C4 and the cloud point C3 may be the same as or different from each other. The cloud point C5 and the cloud point C3 may be the same as or different from each other. The cloud point C4 and the cloud point C5 may be the same as or different from each other. The interlayer film including the fourth layer and the fifth layer, in addition to the first layer, the second layer, and the third layer, further enhances the sound-insulating property of a laminated glass including the interlayer film in a high frequency range over a wide temperature range. Moreover, presence of the fourth layer and the fifth layer as the surface layers enhances the handleability of the interlayer film.

From the standpoint of further enhancing the sound-insulating property of the laminated glass in a high frequency range, the cloud point C1 is preferably 5° C. or lower, more preferably 0° C. or lower, still more preferably −5° C. or lower, and particularly preferably −10° C. or lower. When the cloud point C1 is low, the sound-insulating property of the laminated glass in a high frequency range is further enhanced. The lower limit of the cloud point C1 is not particularly limited.

From the standpoint of further enhancing the sound-insulating property of the laminated glass in a high frequency range, the cloud point C2 is higher than the cloud point C1 preferably by at least 10° C. and more preferably by at least 20° C. From the standpoint of further enhancing the sound-insulating property of the laminated glass in a high frequency range, the cloud point C2 is preferably 10° C. or higher, more preferably 15° C. or higher, still more preferably 30° C. or higher, and particularly preferably 40° C. or higher. Further, the cloud point C2 is preferably 80° C. or lower, more preferably 70° C. or lower, and still more preferably 60° C. or lower.

From the standpoint of further enhancing the sound-insulating property of the laminated glass in a high frequency range, the cloud point C3, the cloud point C4, and the cloud point C5 each are preferably higher than the cloud point C2 by at least 50° C.

From the standpoint of further enhancing the sound-insulating property of the laminated glass in a high frequency range, the cloud point C3, the cloud point C4, and the cloud point C5 each are higher than the cloud point C1 preferably by at least 60° C., more preferably by at least 80° C., still more preferably by at least 100° C., and particularly preferably by at least 120° C. From the standpoint of further enhancing the sound-insulating property of the laminated glass in a high frequency range, the cloud point C3, the cloud point C4, and the cloud point C5 each are preferably 80° C. or higher and more preferably 100° C. or higher. The upper limits of the cloud point C3, the cloud point C4, and the cloud point C5 are not particularly limited. The cloud point C3, the cloud point C4, and the cloud point C5 each are preferably not higher than 150° C. and more preferably not higher than 130° C.

The cloud point is measured in conformity with JIS K2269. The cloud point is a cloud point measured in conformity with JIS K2267 "Testing methods for pour point and cloud point of crude oil and petroleum products". The cloud point measured by using the polyvinyl acetal resin and the plasticizer specifically refers to a cloud point measured by the following method. An amount of. 3.5 g (100 parts by weight) of a plasticizer, and an amount of 0.28 g (8 parts by weight) of a polyvinyl acetal are prepared, and the plasticizer (3.5 g (100 parts by weight)) and the polyvinyl acetal (0.28 g (8 parts by weight)) are mixed in a test tube (diameter: 2 cm). The resulting solution in which the polyvinyl acetal resin is dissolved is heated to 150° C. The test tube is then left to stand under a −20° C. atmosphere until the solution is cooled to −15° C. Alternatively, the test tube is left to stand under a −196° C. atmosphere until the solution was cooled to the pour point of the plasticizer. The temperature at which a part of the solution becomes turbid is the cloud point (First method for determining the cloud point). A lower cloud point indicates higher compatibility between the polyvinyl acetal resin and the plasticizer. In the case where a part of the solution becomes turbid when the test tube is left to stand under a −20° C. atmosphere until the solution is cooled to −15° C., the test tube is left to stand under a −20° C. atmosphere, not under a −196° C. atmosphere.

There may be a case where a part of the solution does not become turbid even when the solution is cooled to the pour point of the plasticizer. In such a case, the cloud point is determined to be much lower than 0° C. Moreover, in such a case, the compatibility between the polyvinyl acetal resin and the plasticizer is very high.

Accordingly, the cloud point C1 is determined by using the first liquid that is obtained by preparing 8 parts by weight of the first polyvinyl acetal resin contained in the first layer and 100 parts by weight of the first plasticizer contained in the first layer and then dissolving 8 parts by weight of the first polyvinyl acetal resin in 100 parts by weight of the first plasticizer. The second liquid, the third liquid, the fourth liquid, and the fifth liquid prepared in the same manner as in the case of the first liquid for determining the cloud point C1 are used in determination of the cloud point C2, the cloud point C3, the cloud point C4, and the cloud point C5.

Exemplary methods for determining the temperature (cloud point) at which a part of the solution becomes turbid include: a method for visual observation of the appearance of the solution, a method for measuring the haze of the solution using a haze meter, and a method for determination of the turbidness with reference to boundary samples preliminary prepared to show plural degrees of turbidness. In particular, the method for visual observation of the appearance of the solution is preferred. When the haze of the solution is measured by using a haze meter, the temperature at which the haze becomes 10% or more is regarded as the cloud point.

The cloud point measured by using the polyvinyl acetal resin and the plasticizer is also determined by the following method. An amount of 3.5 g (100 parts by weight) of a plasticizer and an amount of 0.28 g (8 parts by weight) of a polyvinyl acetal resin are prepared, and the plasticizer (3.5 g (100 parts by weight)) and the polyvinyl acetal (0.28 g (8 parts by weight)) are mixed in a test tube (diameter: 2 cm). The resulting solution in which the polyvinyl acetal resin is dissolved in the plasticizer is heated to 150° C. The test tube is then left to stand in a thermostatic chamber at a predetermined temperature for one hour. The temperature of the thermostatic chamber is maintained and the haze of the solution in the test tube is measured by using a haze meter. The cloud point is determined based on whether or not the haze is 10% or more (Second method for determining the cloud point). For example, such test tubes are left to stand for one hour in thermostatic chambers, temperatures of which are changed in increments of 5° C. (for example, in the case where the cloud point around 0° C. is determined, the temperatures of the chambers are set to 5° C., 0° C., and −5° C.). The temperatures of the thermostatic chambers are maintained and the haze of each solution in the test tube is measured by using a haze meter to determine the temperature at which the haze becomes 10% or more. It is preferred that the haze is less than 10% in measurement performed, using a haze meter, on each of the solutions in the test tubes left to stand for one hour in thermostatic chambers, while the temperatures of the chambers are maintained. Here, temperatures of the chambers are changed in increments of 5° C.

In the present invention, the cloud points may be determined by the first method for determining the cloud point or may be determined by the second method for determining the cloud point. Employment of the first method for determining the cloud point is preferred, but the second method for determining the cloud point may also be employed for the purpose of specifying the cloud point more precisely.

In the following, specific descriptions are given on the first layer, the second layer, the third layer, the fourth layer, and the fifth layer included in the interlayer film for laminated glass according to the present invention, and on the polyvinyl acetal resins and plasticizers contained in the first layer, the second layer, the third layer, the fourth layer, and the fifth layer.

(Polyvinyl Acetal Resin)

The first layer contains the first polyvinyl acetal resin. The second layer contains the second polyvinyl acetal resin. The third layer contains the third polyvinyl acetal resin. The fourth layer contains the fourth polyvinyl acetal resin. The fifth layer contains the fifth polyvinyl acetal resin. Each of the first polyvinyl acetal resin, the second polyvinyl acetal resin, the third polyvinyl acetal resin, the fourth polyvinyl acetal resin, and the fifth polyvinyl acetal resin may include only one resin or two or more resins in combination. In the case where the first layer contains two or more kinds of the first polyvinyl acetal resins, "8 parts by weight of the first polyvinyl acetal resin" in measurement of the cloud point C1 is prepared by blending the two or more kinds of the first polyvinyl acetal resin in a total amount of 8 parts by weight in a weight ratio in the first layer. Also in the case where the second layer, the third layer, the fourth layer, and the fifth layer contains two or more kinds of the second polyvinyl acetal resin, the third polyvinyl acetal resin, the fourth polyvinyl acetal resin, and the fifth polyvinyl acetal resin, respectively, "8 parts by weight of the second polyvinyl acetal resin", "8 parts by weight of the third polyvinyl acetal resin", "8 parts by weight of the fourth polyvinyl acetal resin", and "8 parts by weight of the fifth polyvinyl acetal resin" each are prepared in the same manner as in the case of the "8 parts by weight of the first polyvinyl acetal resin".

The first polyvinyl acetal resin, the second polyvinyl acetal resin, the third polyvinyl acetal resin, the fourth polyvinyl acetal resin, and the fifth polyvinyl acetal resin contained in the first layer, the second layer, the third layer, the fourth layer, and the fifth layer, respectively, are not particularly limited as long as they satisfy the above relationships among the cloud point C1, the cloud point C2, the cloud point C3, the cloud point C4, and the cloud point C5.

The first polyvinyl acetal resin, the second polyvinyl acetal resin, the third polyvinyl acetal resin, the fourth polyvinyl acetal resin, and the fifth polyvinyl acetal resin are produced, for example, by acetalizing polyvinyl alcohol using aldehyde. The polyvinyl alcohol is produced, for example, by saponifying polyvinyl acetate. The polyvinyl alcohol commonly has a degree of saponification of 70 to 99.8 mol %.

An average degree of the polyvinyl alcohol used for production of the first polyvinyl acetal resin, the second polyvinyl acetal resin, the third polyvinyl acetal resin, the fourth polyvinyl acetal resin, and the fifth polyvinyl acetal resin is preferably 200 or more, more preferably 500 or more, still more preferably 1600 or more, particularly preferably 2600 or more, and most preferably 2700 or more. The average degree of polymerization thereof is preferably 5000 or less, more preferably 4000 or less, and still more preferably 3500 or less. When an average degree of polymerization is equal to or higher than the lower limit, the penetration resistance of a laminated glass is further enhanced. When the average degree of polymerization is equal to or lower than the upper limit, an intermediate film is easily formed.

From the standpoint of further enhancing the penetration resistance of the laminated glass, an average degree of the polyvinyl alcohol is particularly preferably 2700 or more and 5000 or less.

The carbon number of an acetal group contained in each of the first polyvinyl acetal resin, the second polyvinyl acetal resin, the third polyvinyl acetal resin, the fourth polyvinyl acetal resin, and the fifth polyvinyl acetal resin is not particularly limited. The aldehyde used in production of the first polyvinyl acetal resin, the second polyvinyl acetal resin, the third polyvinyl acetal resin, the fourth polyvinyl acetal resin, and the fifth polyvinyl acetal resin is not particularly limited. The carbon number of each the acetal groups in the first polyvinyl acetal resin, the second polyvinyl acetal resin, the third polyvinyl acetal resin, the fourth polyvinyl acetal resin, and the fifth polyvinyl acetal resin is preferably 3 to 5, and more preferably 3 or 4. When the carbon number of each the acetal groups in the first polyvinyl acetal resin, the second polyvinyl acetal resin, the third polyvinyl acetal resin, the fourth polyvinyl acetal resin, and the fifth polyvinyl acetal resin is 3 or more, the glass transition temperature of the interlayer film is sufficiently lowered and the sound-insulating property against solid sounds at low temperatures are further enhanced.

The aldehyde is not particularly limited. Commonly, a C1 to C10 aldehyde is suitably used. Examples of the C1-10 aldehydes include propionaldehyde, n-butylaldehyde, isobutylaldehyde, n-valeraldehyde, 2-ethylbutylaldehyde, n-hexylaldehyde, n-octylaldehyde, n-nonylaldehyde, n-decylaldehyde, formaldehyde, acetaldehyde, and benzaldehyde. Among these, propionaldehyde, n-butylaldehyde, isobutylaldehyde, n-hexylaldehyde, or n-valeraldehyde is suitably used. Moreover, propionaldehyde, n-butylaldehyde, or isobutylaldehyde is more preferably used, and n-butylaldehyde is still more preferably used. One aldehyde may be used alone, or two or more aldehydes may be used in combination.

A hydroxy group content (amount of hydroxy groups) of the first polyvinyl acetal resin is 0 mol % or more and preferably 40 mol % or less. A hydroxy group content of the first polyvinyl acetal resin may be 0 mol %. When the hydroxy group content is equal to or lower than the above upper limit, the flexibility of an intermediate film may increase, and thus the intermediate film can be easily handled. From the standpoint of further enhancing the sound-insulating property of the laminated glass in a high frequency range, a hydroxy group content of the first polyvinyl acetal resin is more preferably 35 mol % or less, still more preferably 30 mol % or less, and particularly preferably 25 mol % or less. From the standpoint of further enhancing the sound-insulating property of the laminated glass in a high frequency range, a hydroxy group content of the first polyvinyl acetal resin is preferably as low as possible.

A hydroxy group content (amount of hydroxy groups) of the second polyvinyl acetal resin is preferably 10 mol % or more and preferably 50 mol % or less. When the hydroxy group content is equal to or higher than the above lower limit, the penetration resistance of the laminated glass is further enhanced. When the hydroxy group content is equal to or lower than the above upper limit, the plasticizer is less likely to bleed out. In addition, the flexibility of an intermediate film may increase, and thus the intermediate film can be easily handled. When the hydroxy group content is equal to or lower than the above upper limit, the sound-insulating property of the laminated glass in a high frequency range is further enhanced. From the standpoint of further enhancing the sound-insulating property of the laminated glass in a high frequency range, the second polyvinyl acetal resin has a hydroxy group content of more preferably 15 mol % or more, and more preferably 40 mol % or less. A hydroxy group content of the second polyvinyl acetal resin is still more preferably 20 mol % or more, and still more preferably 35 mol % or less and particularly preferably 30 mol % or less.

The hydroxy group contents (amounts of hydroxy groups) of the third polyvinyl acetal resin, the fourth polyvinyl acetal resin, and the fifth polyvinyl acetal resin each are preferably 20 mol % or more and preferably 50 mol % or less. When the hydroxy group content is equal to or higher than the above lower limit, the penetration resistance of a laminated glass is further enhanced. When the hydroxy group content is equal to or lower than the above upper limit, the plasticizer is less likely to bleed out. In addition, the flexibility of an intermediate film may increase, and thus the intermediate film can be easily handled. From the standpoint of further enhancing the sound-insulating property of the laminated glass in a high frequency range, the hydroxy group contents of the third polyvinyl acetal resin, the fourth polyvinyl acetal resin, and the fifth polyvinyl acetal resin each are more preferably 25 mol % or more, and more preferably 45 mol % or less. The hydroxy group contents of the third polyvinyl acetal resin, the fourth polyvinyl acetal resin, and the fifth polyvinyl acetal resin each are still more preferably 30 mol % or more, and still more preferably 40 mol % or less and particularly preferably 35 mol % or less.

The hydroxy group contents of the first polyvinyl acetal resin, the second polyvinyl acetal resin, the third polyvinyl acetal resin, the fourth polyvinyl acetal resin, and the fifth polyvinyl acetal resin each are a value of a mol fraction in percentage (mol %) which is obtained by division of the amount of ethylene groups bonded with hydroxyl groups by the total amount of ethylene groups of the main chain. The amount of ethylene groups bonded with hydroxyl groups, for example, is determined by measurement in conformity with JIS K6726 "Testing methods for polyvinyl alcohol" or in conformity with ASTM D1396-92.

An acetylation degree (amount of acetyl groups) of the first polyvinyl acetal resin is 0 mol % or more and preferably 50 mol % or less. An acetylation degree of the first polyvinyl acetal resin may be 0 mol %. From the standpoint of further enhancing the sound-insulating property of the laminated glass in a high frequency range, an acetylation degree (amount of acetyl groups) of the first polyvinyl acetal resin is more preferably 10 mol % or more and still more preferably 15 mol % or more, and more preferably 45 mol % or less. An acetylation degree of the first polyvinyl acetal resin may be 30 mol % or less. For further enhancement of the sound-insulating property of the laminated glass, an acetylation degree of the first polyvinyl acetal resin is preferably exceeding 30 mol %.

An acetylation degree (amount of acetyl groups) of the second polyvinyl acetal resin is 0 mol % or more and preferably 30 mol % or less. An acetylation degree of the second polyvinyl acetal resin may be 0 mol %. When an acetylation degree is equal to or lower than the above upper limit, the strength of the interlayer film is enhanced, so that mechanical properties thereof are improved. From the standpoint of further enhancing the sound-insulating property of the laminated glass in a high frequency range, an acetylation degree of the second polyvinyl acetal resin is more preferably 5 mol % or more and still more preferably 10 mol % or more, and preferably less than 15 mol % and more preferably 12 mol % or less. When an acetylation degree of the second polyvinyl acetal resin is less than 3 mol %, mechanical properties of the interlayer film are further enhanced. As a result, the penetration resistance of the laminated glass is further enhanced.

The acetylation degrees of the third polyvinyl acetal resin, the fourth polyvinyl acetal resin, and the fifth polyvinyl acetal resin each are 0 mol % or more and preferably 10 mol % or less. The acetylation degrees of the third polyvinyl acetal resin, the fourth polyvinyl acetal resin, and the fifth polyvinyl acetal resin each may be 0 mol %. When an acetylation degree is equal to or lower than the above upper limit, the strength of the interlayer film is enhanced, so that the mechanical properties thereof are improved. From the standpoint of further enhancing the sound-insulating property of the laminated glass in a high frequency range, the acetylation degrees of the third polyvinyl acetal resin, the fourth polyvinyl acetal resin, and the fifth polyvinyl acetal resin each are preferably 8 mol % or less, still more preferably less than 5 mol %, and particularly preferably less than 3 mol %. The acetylation degrees of the third polyvinyl acetal resin, the fourth polyvinyl acetal resin, and the fifth polyvinyl acetal resin each are more preferably 0.1 mol % or more and particularly preferably 2 mol % or less. When the acetylation degrees of the third polyvinyl acetal resin, the fourth polyvinyl acetal resin, and the fifth polyvinyl acetal resin each are less than 3 mol %, mechanical properties of the interlayer film are further improved. Consequently, the penetration resistance of the laminated glass is further enhanced.

From the standpoint of further enhancing the sound-insulating property of the laminated glass in a high frequency range over a wide temperature range, an acetylation degree of the first polyvinyl acetal resin is higher than an acetylation degree of the second polyvinyl acetal resin and an acetylation degree of the third polyvinyl acetal resin. In the case where the fourth layer is provided, an acetylation degree of the first polyvinyl acetal resin is preferably higher than an acetylation degree of the second polyvinyl acetal resin, an acetylation degree of the third polyvinyl acetal resin, and an acetylation degree of the fourth polyvinyl acetal resin. In the case where the fifth layer is provided, an acetylation degree of the first polyvinyl acetal resin is preferably higher than an acetylation degree of the fifth polyvinyl acetal resin. From the standpoint of further enhancing the sound-insulating property of the laminated glass in a high frequency range over a wide temperature range, an acetylation degree of the first polyvinyl acetal resin is higher than an acetylation degree of the second polyvinyl acetal resin, an acetylation degree of the third polyvinyl acetal resin, an acetylation degree of the fourth polyvinyl acetal resin, and an acetylation degree of the fifth polyvinyl acetal resin preferably by at least 4 mol % and more preferably by at least 7 mol %.

From the standpoint of further enhancing the sound-insulating property of the laminated glass in a high frequency range over a wide temperature range, an acetylation degree of the third polyvinyl acetal resin is preferably lower than an acetylation degree of the first polyvinyl acetal resin and an acetylation degree of the second polyvinyl acetal resin. In the case where the fourth layer is provided, an acetylation degree of the third polyvinyl acetal resin and an acetylation degree of the polyvinyl acetal resin in the fourth layer each are preferably higher than an acetylation degree of the first polyvinyl acetal resin and an acetylation degree in the second layer. In the case where the fifth layer is provided, an acetylation degree of the polyvinyl acetal resin in the fifth layer is preferably lower than an acetylation degree of the first polyvinyl acetal resin and an acetylation degree in the second layer. From the standpoint of further enhancing the sound-insulating property of the laminated glass in a high frequency range over a wide temperature range, the acetylation degrees of the third polyvinyl acetal resin, the fourth polyvinyl acetal resin, and the fifth polyvinyl acetal resin each are lower than the acetylation degrees of the first polyvinyl acetal resin and the second polyvinyl acetal resin preferably by at least 5 mol % and more preferably by at least 10 mol %.

Preferably, an acetylation degree of the first polyvinyl acetal resin contained in the first layer is 15 mol % or more, an acetylation degree of the second polyvinyl acetal resin in the second layer is 5 mol % or more and less than 15 mol %, and an acetylation degree of the third polyvinyl acetal resin in the third layer is less than 5 mol %. In the case where the fourth layer is provided, preferably, an acetylation degree of the first polyvinyl acetal resin in the first layer is 15 mol % or more, an acetylation degree of the second polyvinyl acetal resin in the second layer is 5 mol % or more and less than 15 mol %, an acetylation degree of the third polyvinyl acetal resin in the third layer is less than 5 mol %, and an acetylation degree of the fourth polyvinyl acetal resin in the fourth layer is less than 5 mol %. In such a case, the sound-insulating property of the laminated glass in a high frequency range is further enhanced over a wide temperature range.

The acetylation degree is obtained below. The amount of ethylene groups bonded with the acetal group and the amount of the ethylene groups bonded with the hydroxyl group are subtracted from the total amount of ethylene groups in the main chain. The obtained value is divided by the total amount of ethylene groups in the main chain. The obtained mole fraction expressed as percentage is the acetylation degree. The amount of the ethylene groups bonded with acetal groups, for example, is determined by measurement in conformity with JIS K6728 "Testing methods for polyvinyl butyral" or in conformity with ASTM D1396-92.

An acetalization degree (a butyralization degree in the case of a polyvinyl butyral resin) of the first polyvinyl acetal resin is preferably 20 mol % or more, more preferably 30 mol % or more, and still more preferably 40 mol % or more, and preferably 80 mol % or less, more preferably 75 mol % or less, and still more preferably 65 mol % or less. When an acetalization degree is equal to or higher than the above lower limit, the compatibility between the first polyvinyl acetal resin and the first plasticizer is enhanced, and bleeding out of the plasticizer may be suppressed. When an acetalization degree is equal to or lower than the above upper limit, the reaction time needed for production of the first polyvinyl acetal resin is shortened.

An acetalization degree (a butyralization degree in the case of polyvinyl butyral resin) of the second polyvinyl acetal resin is preferably 45 mol % or more and more preferably 50 mol % or more, and preferably 85 mol % or less and more preferably 80 mol % or less. When an acetalization degree is equal to or higher than the above lower limit, the compatibility between the second polyvinyl acetal resin and the second plasticizer is enhanced. When an acetalization degree is equal to or lower than the above upper limit, the reaction time needed for production of the second polyvinyl acetal resin is shortened.

The acetalization degrees (the butyralization degrees in the case of polyvinyl butyral resin) of the third polyvinyl acetal resin, the fourth polyvinyl acetal resin, and the fifth polyvinyl acetal resin each are preferably 55 mol % or more, more preferably 60 mol % or more, and still more preferably 63 mol % or more, and preferably 85 mol % or less, more preferably 75 mol % or less, and still more preferably 70 mol % or less. When an acetalization degree is equal to or higher than the above lower limit, the compatibility between the third polyvinyl acetal resin, the fourth polyvinyl acetal resin, and the fifth polyvinyl acetal resin and the third plasticizer, the fourth plasticizer, and the fifth plasticizer is enhanced. When an acetalization degree is equal to or lower than the above upper limit, the reaction time needed for production of the third polyvinyl acetal resin, the fourth polyvinyl acetal resin, and the fifth polyvinyl acetal resin is shortened.

The acetalization degree is a mole percentage calculated from a mole fraction determined by dividing the amount of ethylene groups having an acetal group bonded thereto by the total amount of ethylene groups in the main chain.

The acetalization degree can be calculated by determining the acetylation degree and the hydroxyl group content in mole percentages using the methods based on JIS K 6728 "Testing Methods for Polyvinyl Butyral" or in conformity with ASTM D1396-92, and subtracting the acetylation degree and the hydroxyl group content from 100 mol %.

In the case where the polyvinyl acetal resin is polyvinyl butyral resin, the acetalization degree (the butyralization degree) and the acetylation degree are obtainable based on the results of the measurement in conformity with JIS K6728 "Testing methods for polyvinyl butyral" or in conformity with ASTM D1396-92. Measurement is preferably performed in conformity with ASTM D1396-92.

(Plasticizer)

The first layer contains the first plasticizer. The second layer contains the second plasticizer. The third layer contains the third plasticizer. The fourth layer contains the fourth plasticizer. The fifth layer contains the fifth plasticizer. The first plasticizer, the second plasticizer, the third plasticizer, the fourth plasticizer, and the fifth plasticizer each may include only one plasticizer or two or more plasticizers in combination. The first plasticizer, the second plasticizer, the third plasticizer, the fourth plasticizer, and the fifth plasticizer may be the same as or different from one another. When the first layer contains two or more first plasticizers, "100 parts by weight of the first plasticizer" in measurement of the cloud point C1 is prepared by blending the two or more first plasticizers such that the total amount becomes 100 parts by weight in the weight ratio in the first layer. Also in the case where the second layer, the third layer, the fourth layer and the fifth layer contains two or more the second plasticizer, the third plasticizer, the fourth plasticizer, and the fifth plasticizer, respectively, "100 parts by weight of the second plasticizer", "100 parts by weight of the third plasticizer", "100 parts by weight of the fourth plasticizer", and "100 parts by weight of the fifth plasticizer" each are prepared in the same manner as in the case of the "100 parts by weight of the first plasticizer".

The first plasticizer, the second plasticizer, the third plasticizer, the fourth plasticizer, and the fifth plasticizer are not particularly limited, as long as the cloud point C1, the cloud point C2, the cloud point C3, the cloud point C4, and the cloud point C5 satisfy the above relationships. Conventionally known plasticizers may be used as the first plasticizer, the second plasticizer, the third plasticizer, the fourth plasticizer, and the fifth plasticizer.

Examples of the first plasticizer, the second plasticizer, the third plasticizer, the fourth plasticizer, and the fifth plasticizer include: organic ester plasticizers such as monobasic organic esters and phosphoric acid plasticizers such as organic phosphoric acid plasticizers and organic phosphorous acid plasticizers. Among these, preferred are organic ester plasticizers. The first plasticizer, the second plasticizer, the third plasticizer, the fourth plasticizer, and the fifth plasticizer each are preferably a liquid plasticizer.

The monobasic organic esters are not particularly limited, and examples thereof include: glycol esters obtained from a reaction between a glycol and a monobasic organic acid; and esters of a monobasic organic acid and one of triethylene glycol and tripropylene glycol. Examples of the glycol include triethylene glycol, tetraethylene glycol, and tripropylene glycol. Examples of the monobasic organic acid include butyric acid, isobutyric acid, caproic acid, 2-ethylbutyric acid, hepthylic acid, n-octylic acid, 2-ethylhexylic acid, n-nonylic acid, and decylic acid.

The polybasic organic esters are not particularly limited, and examples thereof include an ester compound of a polybasic organic acid and a C4-8 alcohol having a linear or branched structure. Examples of the polybasic organic acid include adipic acid, sebacic acid, and azelaic acid.

The organic ester plasticizers are not particularly limited, and examples thereof include triethylene glycol di-2-ethylpropanoate, triethylene glycol diacetate, triethylene glycol di-n-propanoate, triethylene glycol di-n-butanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethyl butyrate, 1,4-butylene glycol di-2-ethyl butyrate, diethylene glycol di-2-ethyl butyrate, diethylene glycol di-2-ethylhexanoate, dipropylene glycol di-2-ethyl butyrate, triethylene glycol di-2-ethylpentanoate, tetraethylene glycol di-2-ethyl butyrate, diethylene glycol dicaprylate, dihexyl adipate, dioctyl adipate, hexylcyclohexyladipate, mixtures of heptyl adipate and nonyl adipate, diisononyl adipate, diisodecyl adipate, heptylnonyl adipate, dibutyl sebacate, oil-modified alkyd sebacate, and mixtures of phosphate esters and adipic acid esters. Organic ester plasticizers other than these may also be used.

The organic phosphoric acid plasticizers are not particularly limited, and examples thereof include tributoxyethyl phosphate, isodecylphenyl phosphate, and triisopropyl phosphate.

From the standpoint of further enhancing the sound-insulating property of the laminated glass in a high frequency range, the first plasticizer, the second plasticizer, the third plasticizer, the fourth plasticizer, and the fifth plasticizer in the first layer, the second layer, the third layer, the fourth layer, and the fifth layer each preferably contain a diester plasticizer represented by the following formula (1).

[Chem. 1]

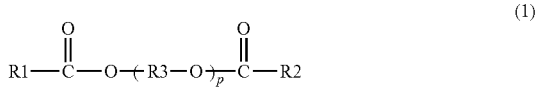

(1)

In the formula (1), R1 and R2 each represent a C1-10 organic group, R3 represents an ethylene group, isopropylene group, or n-propylene group, and p represents an integer of 2 to 10. In the formula (1), p is preferably 3 or more and preferably 8 or less.

From the standpoint of further enhancing the sound-insulating property of the laminated glass in a high frequency range, the first plasticizer in the first layer preferably contains a diester plasticizer represented by the following formula (1A). In addition, the second plasticizer, the third plasticizer, the fourth plasticizer, and the fifth plasticizer each may contain a diester plasticizer represented by the formula (1A).

[Chem. 2]

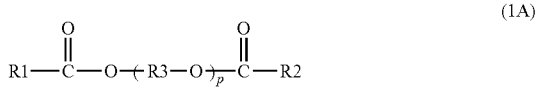

(1A)

In the formula (1A), R1 and R2 each represent a C2-5 organic group, R3 represents an ethylene group, isopropylene group, or n-propylene group, and p represents an integer of 2 to 10. R1 and R2 in the formula (1A) each preferably represent a C2-4 organic group. In the formula (1A), p is preferably 3 or more and preferably 8 or less.

From the standpoint of further enhancing the penetration resistance of the interlayer film and laminated glass, the second plasticizer, the third plasticizer, the fourth plasticizer, and the fifth plasticizer contained in the second layer, the third layer, the fourth layer, and the fifth layer, respectively, are preferably a diester plasticizer represented by the following formula (1B). The second plasticizer, the third plasticizer, the fourth plasticizer, and the fifth plasticizer may be the same as or different from one another. In addition, the first plasticizer may contain a diester plasticizer represented by the formula (1B).

[Chem. 3]

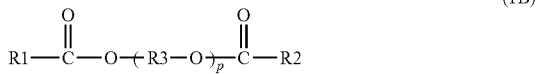

(1B)

In the formula (1B), R1 and R2 each represent a C6-10 organic group, R3 represents an ethylene group, isopropylene group, or n-propylene group, and p represents an integer of 2 to 10. In the formula (1B), R1 and R2 each preferably has a carbon number of 8 or less. In the formula (1B), p is preferably 3 or more and preferably 8 or less.

The second plasticizer, the third plasticizer, the fourth plasticizer, and the fifth plasticizer each contain preferably at least one of triethylene glycol di-2-ethylhexanoate (3GO), triethylene glycol di-2-ethyl butyrate (3GH), triethylene glycol diacetate (3G1), triethylene glycol di-n-propanoate (3GE), and triethylene glycol di-n-butanoate (3GB), more preferably at least one of triethylene glycol di-2-ethylhexanoate (3GO), triethylene glycol di-2-ethyl butyrate (3GH), triethylene glycol di-n-propanoate (3GE), and triethylene glycol di-n-butanoate (3GB), still more preferably at least one of triethylene glycol di-2-ethylhexanoate (3GO) and triethylene glycol di-2-ethyl butyrate (3GH), and particularly preferably triethylene glycol di-2-ethylhexanoate (3GO).

In the first layer, the first plasticizer content (hereinafter, also referred to as a content (1)) based on 100 parts by weight of the first polyvinyl acetal resin is preferably 25 parts by weight or more, more preferably 30 parts by weight or more, still more preferably 40 parts by weight or more, and particularly preferably 50 parts by weight or more, and preferably 80 parts by weight or less, more preferably 70 parts by weight or less, and still more preferably 60 parts by weight or less. When the first plasticizer content satisfies the lower limit and the above upper limit, the sound-insulating property of the laminated glass in a high frequency range is further enhanced. When the first plasticizer content is equal to or bigger than the above lower limit, the penetration resistance of the laminated glass is further enhanced. When the first plasticizer content is equal to or smaller than the above upper limit, the transparency of the interlayer film is further enhanced.

In the second layer, the second plasticizer content (hereinafter, also referred to as a content (2)) based on 100 parts by weight of the second polyvinyl acetal resin is preferably 10 parts by weight or more, more preferably 15 parts by weight or more, still more preferably 30 parts by weight or more, and particularly preferably 40 parts by weight or more, and preferably 90 parts by weight or less, more preferably 80 parts by weight or less, still more preferably 70 parts by weight or less, and particularly preferably 60 parts by weight or less. When the second plasticizer content satisfies the above lower limit and the above upper limit, the sound-insulating property of the laminated glass in a high frequency range is further enhanced. When the second plasticizer content is equal to or bigger than the above lower limit, the penetration resistance of the laminated glass is further enhanced. When the second plasticizer content is equal to or smaller than the above upper limit, the transparency of the interlayer film is further enhanced.

In the third layer, the third plasticizer content (hereinafter, also referred to as a content (3)) based on 100 parts by weight of the third polyvinyl acetal resin is preferably 5 parts by weight or more, more preferably 10 parts by weight or more, and still more preferably 30 parts by weight or more, and preferably 50 parts by weight or less, more preferably 45 parts by weight or less, and still more preferably 40 parts by weight or less. In the fourth layer, the fourth plasticizer content (hereinafter, also referred to as a content (4)) based on 100 parts by weight of the fourth polyvinyl acetal resin is preferably 5 parts by weight or more, more preferably 10 parts by weight or more, and preferably 50 parts by weight or less and more preferably 45 parts by weight or less. In the fifth layer, the fifth plasticizer content (hereinafter, also referred to as a content (5)) based on 100 parts by weight of the fifth polyvinyl acetal resin is preferably 5 parts by weight or more and more preferably-10 parts by weight or more, and preferably 50 parts by weight or less and more preferably 45 parts by weight or less. When the third plasticizer, the fourth plasticizer, and the fifth plasticizer each satisfy the above lower limit and the above upper limit, the sound-insulating property of the laminated glass in a high frequency range is further enhanced. When each of the third plasticizer content, the fourth plasticizer content, and the fifth plasticizer content is equal to or bigger than the above lower limit, the penetration resistance of the laminated glass is further enhanced. When each of the third plasticizer content, the fourth plasticizer content, and the fifth plasticizer content is equal to or smaller than the above upper limit, the transparency of the interlayer film is further enhanced.

From the standpoint of further enhancing the penetration resistance of the laminated glass, the content (3), the content (4), and the content (5) each are preferably smaller than the content (1).

The difference between the content (1) and each of the content (3), the content (4), and the content (5) is preferably 5 parts by weight or more, more preferably 10 parts by weight or more, and still more preferably 12 parts by weight or more, and preferably 40 parts by weight or less, more preferably 35 parts by weight or less, and still more preferably 30 parts by weight or less. When the difference between the content (1) and each of the content (3), the content (4), and the content (5) is equal to or bigger than the above lower limit, the sound-insulating property of the laminated glass is further enhanced. When the difference between the content (1) and each of the content (3), the content (4), and the content (5) is equal to or smaller than the above upper limit, the penetration resistance of the laminated glass is further enhanced. The difference between the content (1) and each of the content (3), the content (4), and the content (5) is obtained by subtracting each of the content (3), the content (4), and the content (5) from the content (1).

From the standpoint of further enhancing the penetration resistance of the laminated glass, the content (3), content (4), and the content (5) each are preferably smaller than the content (2).

The difference between the content (2) and each of the content (3), the content (4), and the content (5) is preferably 5 parts by weight or more and more preferably 10 parts by weight or more, and preferably 30 parts by weight or less and more preferably 25 parts by weight or less. When the difference between the content (2) and each of the content (3), the content (4), and the content (5) is equal to or bigger than the above lower limit, the sound-insulating property of the laminated glass is further enhanced. When the difference between the content (2) and each of the content (3), the content (4), and the content (5) is equal to or smaller than the above upper limit, the penetration resistance of the laminated glass is further enhanced. The difference between the content (2) and each of the content (3), the content (4), and the content (5) is obtained by subtracting each of the content (3), the content (4), and the content (5) from the content (2).

From the standpoint of further enhancing the penetration resistance of the laminated glass, the content (2) is preferably smaller than the content (1).

The difference between the content (1) and the content (2) is preferably 1 part by weight or more and more preferably 5 parts by weight or more, and preferably 20 parts by weight or less and more preferably 15 parts by weight or less. When the difference between the content (1) and the content (2) is equal to or bigger than the above lower limit, the sound-insulating property of the laminated glass is further enhanced. When the difference between the content (1) and the content (2) is equal to or smaller than the above upper limit, the penetration resistance of the laminated glass is further enhanced. The difference between the content (1) and the content (2) is obtained by subtracting the content (2) from the content (1).

The total amount of the first plasticizer, the second plasticizer, and the third plasticizer in the first layer, the second layer, and the third layer based on 100 parts by weight of the total of the first polyvinyl acetal resin, the second polyvinyl acetal resin, and the third polyvinyl acetal resin in the first layer, the second layer, and the third layer is preferably 30 parts by weight or more and preferably 50 parts by weight or less. In such a case, the sound-insulating property of the laminated glass in a high frequency range is further enhanced over a wide temperature range.

The total amount of the first plasticizer, the second plasticizer, the third plasticizer and the fourth plasticizer in the first layer, the second layer, the third layer, and the fourth layer based on 100 parts by weight of the total amount of the first polyvinyl acetal resin, the second polyvinyl acetal resin, the third polyvinyl acetal resin, and the fourth polyvinyl acetal resin in the first layer, the second layer, the third layer, and the fourth layer is preferably 30 parts by weight or more and preferably 50 parts by weight or less. In this case, the sound-insulating property of the laminated glass in a high frequency range is further enhanced over a wide temperature range.

The amount of all the plasticizers contained in the interlayer film for laminated glass based on 100 parts by weight of all the polyvinyl acetal resins contained in the interlayer film for laminated glass according to the present invention is preferably 30 parts by weight or more and more preferably 35 parts by weight or more, and preferably 50 parts by weight or less, more preferably 45 parts by weight or less, and still more preferably 42 parts by weight or less. In such a case, the sound-insulating property of the laminated glass in a high frequency range is enhanced over a wide temperature range.

In determination of the total amount of the polyvinyl acetal resins and the total amount of the plasticizers contained in the first layer, the second layer, and the third layer, or in the first layer, the second layer, the third layer, and the fourth layer, the density of these components should be considered. In determination of the total amount of all the polyvinyl acetal resins and the total amount of all the plasticizers contained in the interlayer film, the amounts may be calculated in consideration of the density of these components.

(Other Components)

The first layer, the second layer, the third layer, the fourth layer, and the fifth layer each may optionally contain additives such as ultraviolet absorbers, antioxidants, light stabilizers, flame retardants, antistatic agents, pigments, dyes, adhesion modifiers, moisture-proof agents, fluorescent brighteners, or infrared absorbers. Each of these additives may be used alone, or two or more of them may be used in combination.

(Interlayer Film for Laminated Glass)

From the standpoint of further enhancing the sound-insulating property of the laminated glass in a high frequency range at low temperatures, a peak temperature of tan δ which appears at the lowest temperature measured at a frequency of 1 Hz is preferably 0° C. or lower.

From the standpoint of further enhancing the sound-insulating property of the laminated glass in a high frequency range, a maximum value of tan δ at a peak temperature of tan δ which appears at the lowest temperature measured at a frequency of 1 Hz is preferably 0.8 or more and more preferably 1.15.

From the standpoint of further enhancing the sound-insulating property of the laminated glass at high temperature and in a high frequency range, a maximum value of tan δ at a peak temperature of tan δ which appears at the highest temperature measured at a frequency of 1 Hz is preferably 0.55 or more.

In measurement of a peak temperature of tan δ which appears at the lowest temperature, a maximum value of tan δ at a peak temperature of tan δ which appears at the lowest temperature, and a maximum value of tan δ at a peak temperature of tan δ which appears at the highest temperature, the interlayer film for laminated glass is preferably stored under the condition of 23° C. for a month before the measurement.

A thickness of the first layer is preferably in a range of 0.02 to 1.8 mm. A thickness of the first layer is more preferably 0.05 mm or more and more preferably 0.5 mm or less. With such a preferred thickness, the interlayer film may not be too thick and the sound-insulating properties of the interlayer film and the laminated glass may be further enhanced.

A thickness of the second layer is preferably in a range of 0.03 to 1.2 mm. A thickness of the second layer is preferably 0.04 mm or more and more preferably 0.5 mm or less. With such a preferably thickness, the interlayer film may not be too thick and the sound-insulating properties of the interlayer film and the laminated glass may be further enhanced.

The thicknesses of the third layer, the fourth layer, and the fifth layer each are preferably in a range of 0.1 to 1 mm. The thicknesses of the third layer, the fourth layer, and the fifth layer each are more preferably 0.2 mm or more and more preferably 0.5 mm or less. When the thicknesses of the third layer, the fourth layer, and the fifth layer each satisfy the above lower limit and the upper limit, the interlayer film may not be too thick, the sound-insulating properties of the interlayer film and the laminated glass may be further enhanced, and bleeding out of the plasticizer may be suppressed.

A thickness of the interlayer film for laminated glass according to the present invention is preferably in a range of 0.1 to 3 mm. A thickness of the interlayer film is more preferably 0.25 mm or more and more preferably 1.5 mm or less. When a thickness of the interlayer film is equal to or thicker than the above lower limit, the penetration resistance of the interlayer film and laminated glass is sufficiently enhanced. When a thickness of the interlayer film is equal to or thinner than the above upper limit, the transparency of the interlayer film is further enhanced.

When a thickness (mm) of the interlayer film for laminated glass according to the present invention is T, a total thickness ((thickness T1 of the first layer)+(thickness T2 of the second layer)) (mm) of the first layer and the second layer is preferably 0.05T or more and more preferably 0.08T or more, and preferably 0.6T or less and more preferably 0.4T or less.

When the fourth layer is provided, the ratio ((T1+T2)/(T3+T4)) of the total thickness ((thickness T1 of the first layer)+(thickness T2 of the second layer)) of the first layer and the second layer to the total thickness ((thickness T3 of the third layer)+(thickness T4 of the fourth layer)) of the third layer and the fourth layer is preferably 0.1 or more and more preferably 0.12 or more, and preferably 0.5 or less and more preferably 0.3 or less.

The method for producing the interlayer film for laminated glass according to the present invention is not particularly limited. A conventionally known method may be employed for the method for producing the interlayer film. An exemplary production method includes mixing a polyvinyl acetal resin, a plasticizer, and other components added according to needs, and forming the interlayer film from the mixture. A production method through extrusion molding is preferred because of suitability for continuous production.

A method for mixing the components is not particularly limited. Exemplary methods include a method using an extruder, plastograph, kneader, Banbury mixer, or calender roll. In particular, a production method using an extruder is preferred because of suitability for continuous production, and a method using a twin-screw extruder is more preferred. The interlayer film for laminated glass according to the present invention may be produced by separately preparing individual layers and stacking the layers to give a multilayer interlayer film, or by stacking the individual layers by co-extrusion to give an interlayer film.

(Laminated Glass)

Figure 4:
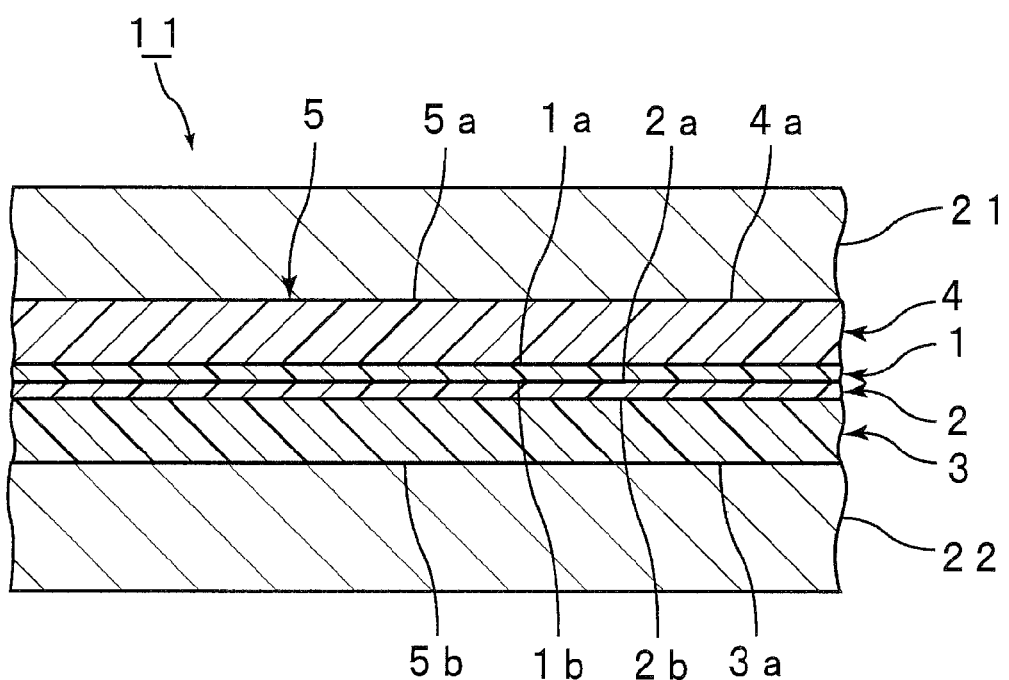
FIG. 4 is a partially cutaway cross-sectional view schematically illustrating one example of a laminated glass using the interlayer film for laminated glass illustrated in FIG. 1.

FIG. 4 is a cross-sectional view schematically illustrating one example of a laminated glass using the interlayer film for laminated glass illustrated in FIG. 1.

A laminated glass 11 illustrated in FIG. 4 includes an interlayer film 5, a first component for laminated glass 21 and a second component for laminated glass 22. The interlayer film 5 is sandwiched between the first component for laminated glass 21 and the second component for laminated glass 22. The first component for laminated glass 21 is on a first surface 5a of the interlayer film 5. The second component for laminated glass 22 is on a second surface 5b that is the opposite face of the first surface 5a of the interlayer film 5. The first component for laminated glass 21 is on an outer surface 4a of the fourth layer 4. The second component for laminated glass 22 is on an outer surface 3a of the third layer 3.

As described above, the laminated glass according to the present invention includes a first component for laminated glass, a second component for laminated glass, and an interlayer film sandwiched between the first component for laminated glass and the second component for laminated glass, and the interlayer film according to the present invention is used as the interlayer film therein.

Examples of the first component for laminated glass and the second component for laminated glass include glass plates and PET (polyethylene terephthalate) films. The laminated glass includes not only a laminated glass in which an interlayer film is sandwiched between two glass plates but also a laminated glass in which an interlayer film is sandwiched between a glass plate and a PET film or the like. The laminated glass refers to a laminate including a glass plate and preferably includes at least one glass plate.

Examples of the glass plate include inorganic glass and organic glass. Examples of the inorganic glass include float plate glass, heat absorbing glass, heat rays reflecting plate glass, polished plate glass, molded plate glass, meshed plate glass, wired plate glass, clear glass, and green glass. The organic glass is synthetic resin glass that substitutes for inorganic glass. Examples of the organic glass include polycarbonate plates and poly(meth)acryl resin plates. Examples of the poly(meth)acryl resin plate include polymethyl(meth)acrylate plates.

The thicknesses of the first component for laminated glass and the second component for laminated glass are not particularly limited, and are within a range of 1 to 5 mm. When the component for laminated glass is a glass plate, a thickness of the glass plate is preferably 1 to 5 mm. When the component for laminated glass is a PET film, a thickness of the PET film is preferably 0.03 to 0.5 mm.

A method for producing the laminated glass is not particularly limited. For example, the first component for laminated glass and the second component for laminated glass with the interlayer film interposed therebetween is pressed by a pressing roll or vacuumed under reduced pressure in a rubber bag so that the air remaining between the first component for laminated glass and the interlayer film, and between the second component for laminated glass and the interlayer film is removed. Then, the pressed components are preliminarily adhered at about 70 to 110° C. to give a laminate. The laminate is placed in an autoclave or is pressed, so that the laminate is pressure-bonded at about 120 to 150° C. under a pressure of 1 to 1.5 MPa. Thereby, a laminated glass can be obtained.

The laminated glass can be used for cars, railway carriages, aircrafts, ships, buildings, and the like. The laminated glass can also be used for other uses. The interlayer film is preferably an interlayer film for buildings or vehicles, and more preferably an interlayer film for vehicles. The laminated glass is preferably a laminated glass for buildings or vehicles, and more preferably a laminated glass for vehicles. The interlayer film and the laminated glass are suitably used for electric vehicles including electric motors and hybrid electric vehicles including internal combustion engines and electric motors. The laminated glass can be used for windshields, side glass, rear glass, roof glass, or the like of cars.

The present invention is more specifically described with reference to examples. The present invention is not limited only to these examples.

In examples and comparative examples, the following polyvinyl acetal resins and plasticizers were used. The acetalization degree (butyralization degree), the acetylation degree, and the hydroxy group content of each polyvinyl acetal resin were measured by a method in conformity with ASTM D1396-92. Also in the case where the measurement was performed in conformity with JIS K6728 "Testing methods for polyvinyl butyral", the resulting numerical values were the same as those obtained by the method in conformity with ASTM D1396-92.

(Polyvinyl Acetal Resin)

Polyvinyl acetal resin a (polyvinyl butyral resin, n-butyl aldehyde was used, butyralization degree: 54 mol %, acetylation degree: 21 mol %, hydroxy group content: 25 mol %)

Polyvinyl acetal resin b (polyvinyl butyral resin, n-butyl aldehyde was used, butyralization degree: 56 mol %, acetylation degree: 13 mol %, hydroxy group content: 31 mol %)

Polyvinyl acetal resin c (polyvinyl butyral resin, n-butyl aldehyde was used, butyralization degree: 68.5 mol %, acetylation degree: 1 mol %, hydroxy group content: 30.5 mol %)

Polyvinyl acetal resin d (polyvinyl butyral resin, n-butyl aldehyde was used, butyralization degree: 64 mol %, acetylation degree: 23 mol %, hydroxy group content: 13 mol %)

Polyvinyl acetal resin e (polyvinyl butyral resin, n-butyl aldehyde was used, butyralization degree: 45 mol %, acetylation degree: 40 mol %, hydroxy group content: 15 mol %)

(Plasticizer)

Triethylene glycol di-2-ethylhexanoate (3GO)
Triethylene glycol di-n-propanoate (3GE)
Triethylene glycol di-n-butanoate (3 GB)

EXAMPLE 1

An amount of 100 parts by weight of polyvinyl acetal resin a and 60 parts by weight of a plasticizer (3GO) were sufficiently mixed by using a mixing roll to give a composition for forming an intermediate layer A.

An amount of 100 parts by weight of polyvinyl acetal resin b and 50 parts by weight of a plasticizer (3GO) were sufficiently mixed by using a mixing roll to give a composition for forming an intermediate layer B.

An amount of 100 parts by weight of polyvinyl acetal resin c and 36 parts by weight of a plasticizer (3GO) were sufficiently mixed to give a composition for forming a surface layer C.

The resulting composition for forming an intermediate layer A, composition for forming an intermediate layer B, and composition for forming a surface layer C were molded by using a co-extruder to be formed into a multilayer interlayer film (thickness: 0.87 mm) including four layers of a surface layer C (thickness: 0.375 mm)/an intermediate layer A (thickness: 0.08 mm)/an intermediate layer B (thickness: 0.04 mm)/a surface layer C (thickness: 0.375 mm).

The resulting interlayer film was cut into a size of length 30 mm×width 320 mm. The interlayer film was sandwiched between two clear float glass plates (length 25 mm×width 305 mm×thickness 2.0 mm) and the resulting product was held in a vacuum laminator at 90° C. for 30 minutes for vacuum pressing. Thereby, a laminate was produced. The portion of the interlayer film protruding from the glass plates of the laminate was cut off, whereby a laminated glass was obtained.

COMPARATIVE EXAMPLE 1

A multilayer interlayer film having a laminated structure including three layers was produced in the same manner as in Example 1, except that the kinds of the polyvinyl acetal resins and the kinds and amounts of the plasticizers used in the intermediate layer A and the surface layers C and the thickness of the intermediate layer A were set as shown in Table 1 and that the intermediate layer B was not provided.

COMPARATIVE EXAMPLE 2 AND EXAMPLES 2 TO 33

Multilayer interlayer films having a laminated structure including four layers were provided in the same manner as in Example 1, except that the kinds of the polyvinyl acetal resins and the kinds and amounts of the plasticizers used in the intermediate layer A, intermediate layer B, and surface layer C were changed as shown in Tables 1 to 7.

(Evaluation)

(1) Cloud Point Measured by Using the Polyvinyl Acetal Resin and Plasticizer Contained in the Intermediate Layer A (1-1) Cloud Point Measured by the First Method for Determining the Cloud Point An amount of 3.5 g (100 parts by weight) of the plasticizer used in the intermediate layer A and 0.28 g (8 parts by weight) of the polyvinyl acetal resin used in the intermediate layer A were prepared. The prepared plasticizer (3.5 g (100 parts by weight)) and the polyvinyl acetal resin (0.28 g (8 parts by weight)) were mixed in a test tube (diameter: 2 cm) to give a solution containing the polyvinyl acetal resin dissolved in the plasticizer. The solution in the test tube was heated to 150° C., and the test tube was then left to stand under an atmosphere at −20° C. until the solution was cooled to −15° C. During the standing, the temperature at which a part of the solution became turbid was visually observed, and that temperature was defined as a cloud point.

(1-2) Cloud Point Measured by the Second Method for Determining the Cloud Point

An amount of 3.5 g (100 parts by weight) of the plasticizer used in the intermediate layer A and 0.28 g (8 parts by weight) of the polyvinyl acetal resin used in the intermediate layer A were prepared. The prepared plasticizer (3.5 g (100 parts by weight)) and the polyvinyl acetal resin (0.28 g (8 parts by weight)) were mixed in a test tube (diameter: 2 cm) to give a solution containing the polyvinyl acetal resin dissolved in the plasticizer. The solution in the test tube was heated to 150° C. Such test tubes were individually left to stand for one hour in thermostatic chambers, temperatures of which were changed in increments of 5° C. from 125° C. to −5° C. The haze of the solution in the test tube was measured by using a haze meter while the temperature in the thermostatic chamber was maintained. The maximum temperature at which the haze was 10% or more was defined as a cloud point. The haze was measured by using a haze meter ("TC-HIIIDPK" manufactured by Tokyo Denshoku Co., Ltd.) in conformity with JIS K6714.

As a result, when the cloud point determined by the first method for determining the cloud point was −14° C. or the pour point or lower (i.e., considerably low cloud point), the haze did not measure 10% or more even after standing of the test tube in a thermostatic chamber at −5° C. for one hour. When the cloud point determined by the first method for determining the cloud point was 18° C., the haze did not measure 10% or more after standing of the test tube in a thermostatic chamber at 20° C. for one hour, but the haze measured 10% or more after standing of the test tube in a thermostatic chamber at 15° C. for one hour.

(2) Cloud Point Measured by Using the Polyvinyl Acetal Resin and Plasticizer Contained in the Intermediate layer B (2-1) Cloud Point Measured by the First Method for Determining the Cloud Point An amount of 3.5 g (100 parts by weight) of the plasticizer used in the intermediate layer B and 0.28 g (8 parts by weight) of the polyvinyl acetal resin used in the intermediate layer B were prepared. The prepared plasticizer (3.5 g (100 parts by weight)) and the polyvinyl acetal resin (0.28 g (8 parts by weight)) were mixed in a test tube (diameter: 2 cm) to give a solution containing the polyvinyl acetal resin dissolved in the plasticizer. The solution in the test tube was heated to 150° C., and the test tube was then left to stand under an atmosphere at −20° C. until the solution was cooled to −15° C. During the standing, the temperature at which a part of the solution became turbid was visually observed, and that temperature was defined as a cloud point.

(2-2) Cloud Point Measured by the Second Method for Determining the Cloud Point

An amount of 3.5 g (100 parts by weight) of the plasticizer used in the intermediate layer B and 0.28 g (8 parts by weight) of the polyvinyl acetal resin used in the intermediate layer B were prepared. The prepared plasticizer (3.5 g (100 parts by weight)) and the polyvinyl acetal resin (0.28 g (8 parts by weight)) were mixed in a test tube (diameter: 2 cm) to give a solution containing the polyvinyl acetal resin dissolved in the plasticizer. The solution in the test tube was heated to 150° C. Such test tubes were individually left to stand for one hour in thermostatic chambers, temperatures of which were changed in increments of 5° C. from 125° C. to −5° C. The haze of the solution in the test tube was measured by using a haze meter while the temperature in the thermostatic chamber was maintained. The maximum temperature at which the haze was 10% or more was defined as a cloud point. The haze was measured by using a haze meter ("TC-HIIIDPK" manufactured by Tokyo Denshoku Co., Ltd.) in conformity with JIS K6714.

As a result, when the cloud point determined by the first method for determining the cloud point was 18° C., the haze did not measure 10% or more after standing of the test tube in a thermostatic chamber at 20° C. for one hour, but the haze measured 10% or more after standing of the test tube in a thermostatic chamber at 15° C. for one hour. When the cloud point determined by the first method for determining the cloud point was 55° C., the haze did not measure 10% or more after standing of the test tube in a thermostatic chamber at 60° C. for one hour, but the haze measured 10% or more after standing of the test tube in a thermostatic chamber at 55° C. for one hour.

(3) Cloud Point Measured by Using the Polyvinyl Acetal Resin and Plasticizer Contained in the Surface Layer C (3-1) Cloud Point Measured by the First Method for Determining the Cloud Point An amount of 3.5 g (100 parts by weight) of the plasticizer used in the surface layer C and 0.28 g (8 parts by weight) of the polyvinyl acetal resin used in the surface layer C were prepared. The prepared plasticizer (3.5 g (100 parts by weight)) and the polyvinyl acetal resin (0.28 g (8 parts by weight)) were mixed in a test tube (diameter: 2 cm) to give a solution containing the polyvinyl acetal resin dissolved in the plasticizer. The solution in the test tube was heated to 150° C., and the test tube was then left to stand under an atmosphere at −20° C. until the solution was cooled to −15° C. During the standing, the temperature at which a part of the solution became turbid was visually observed, and that temperature was defined as a cloud point.

(3-2) Cloud Point Measured by the Second Method for Determining the Cloud Point

An amount of 3.5 g (100 parts by weight) of the plasticizer used in the intermediate layer C and 0.28 g (8 parts by weight) of the polyvinyl acetal resin used in the intermediate layer C were prepared. The prepared plasticizer (3.5 g (100 parts by weight)) and the polyvinyl acetal resin (0.28 g (8 parts by weight)) were mixed in a test tube (diameter: 2 cm) to give a solution containing the polyvinyl acetal resin dissolved in the plasticizer. The solution in the test tube was heated to 150° C. Such test tubes were individually left to stand for one hour in thermostatic chambers, temperatures of which were changed in increments of 5° C. from 125° C. to −5° C. The haze of the solution in the test tube was measured by using a haze meter while the temperature in the thermostatic chamber was maintained. The maximum temperature at which the haze was 10% or more was defined as a cloud point. The haze was measured by using a haze meter ("TC-HIIIDPK" manufactured by Tokyo Denshoku Co., Ltd.) in conformity with JIS K6714.

As a result, when the cloud point determined by the first method for determining the cloud point was 124° C., the haze did not measure 10% or more after standing of the test tube in a thermostatic chamber at 125° C. for one hour, but the haze measured 10% or more after standing of the test tube in a thermostatic chamber at 120° C. for one hour.

(4) Measurement of Viscoelasticity.

The temperature variance of the dynamic viscoelasticity was measured by a shear method using a rheometer ("ARES", Rheometric Scientific, Inc.) under the conditions that a distortion of 1.0%, a frequency of 1 Hz, and a rate of temperature rise of 5° C./rain. Thereby, a peak temperature of tan δ which appears at the lowest temperature, and a maximum value of tan δ at the peak temperature of tan δ which appears at the lowest temperature were measured.

(5) Loss Factor

A laminated glass stored in an environment at 20° C. for a month was measured for the loss factor by a central exciting method at 10° C. using a measurement device "SA-01" (RION Co., Ltd.). The obtained loss factor (loss factor at 10° C.) in the 6th mode of the resonance frequency (around 6300 Hz) was evaluated.

Further, a laminated glass stored in an environment at 20° C. for a month was measured for the loss factor by a center exciting method at 20° C. using a measurement device "SA-01" (RION Co., Ltd.). The obtained loss factor (loss factor at 20° C.) in the 4th mode of the resonance frequency (around 6300 Hz) was evaluated.

Moreover, a laminated glass stored in an environment at 20° C. for a month was measured for the loss factor by a center exciting method at 30° C. using a measurement device "SA-01" (RION Co., Ltd.). The obtained loss factor (loss factor at 30° C.) in the 6th mode of the resonance frequency (around 6300 Hz) was evaluated.

Also, a laminated glass stored in an environment at 20° C. for a month was measured for the loss factor by a center exciting method at 40° C. using a measurement device "SA- 01" (RION Co., Ltd.). The obtained loss factor (loss factor at 40° C.) in the 6th mode of the resonance frequency (around 6300 Hz) was evaluated.

Tables 1 to 7 show the results. The result "Flow point or lower" with regard to the cloud point means that the cloud point is considerably low, which is much lower than 0° C.

TABLE 1

| | | | Ex. 1 | Comp. Ex. 1 | Comp. Ex. 2 |
|---|---|---|---|---|---|
| Surface layer C | Resin | Kind | c | c | c |
| | | Butyralization degree (mol %) | 68.5 | 68.5 | 68.5 |
| | | Acetylation degree (mol %) | 1 | 1 | 1 |
| | | Hydroxy group content (mol %) | 30.5 | 30.5 | 30.5 |
| | | Amount | 100 | 100 | 100 |
| | Plasticizer | Kind | 3GO | 3GO | 3GO |
| | | Amount | 36 | 38.5 | 38.5 |
| Intermediate layer A | Resin | Kind | a | d | d |
| | | Butyralization degree (mol %) | 54 | 64 | 64 |
| | | Acetylation degree (mol %) | 21 | 23 | 23 |
| | | Hydroxy group content (mol %) | 25 | 13 | 13 |
| | | Amount | 100 | 100 | 100 |
| | Plasticizer | Kind | 3GO | 3GO | 3GO |
| | | Amount | 60 | 60 | 60 |
| Intermediate layer B | Resin | Kind | b | | b |
| | | Butyralization degree (mol %) | 56 | | 56 |
| | | Acetylation degree (mol %) | 13 | | 13 |
| | | Hydroxy group content (mol %) | 31 | | 31 |
| | | Amount | 100 | | 100 |
| | Plasticizer | Kind | 3GO | | 3GO |
| | | Amount | 50 | | 50 |
| Surface layer C | Resin | Kind | c | c | c |
| | | Butyralization degree (mol %) | 68.5 | 68.5 | 68.5 |
| | | Acetylation degree (mol %) | 1 | 1 | 1 |
| | | Hydroxy group content (mol %) | 30.5 | 30.5 | 30.5 |
| | | Amount | 100 | 100 | 100 |
| | Plasticizer | Kind | 3GO | 3GO | 3GO |
| | | Amount | 36 | 38.5 | 38.5 |
| Amount of all the plasticizers contained in the interlayer film based on 100 parts by weight of all the polyvinyl acetal resins contained in the interlayer film (parts by weight) | | | 38.9 | 41.4 | 41 |
| Configuration of film | | | C/A/B/C | C/A/C | C/A/B/C |
| Thickness of surface layer C (μm)/intermediate layer A (μm)/ intermediate layer B (μm)/surface layer C (μm) | | | 375/80/ 40/375 | 350/110/ 350 | 375/80/ 40/375 |
| Cloud point (° C.) measured by using the polyvinyl acetal resin and the plasticizer contained in the intermediate layer A | | | −14 | 18 | 18 |
| Cloud point (° C.) measured by using the polyvinyl acetal resin and the plasticizer contained in the intermediate layer B | | | 55 | — | 55 |
| Cloud point (° C.) measured by using the polyvinyl acetal resin and the plasticizer contained in the surface layer C | | | 124 | 124 | 124 |
| Total thickness of the intermediate layer(s) (μm)/total thickness of the surface layers (μm) | | | 0.16 | 0.16 | 0.16 |
| Peak temperature (° C.) of tan δ which appears at the lowest temperature | | | −7.2 | −3.6 | 1.2 |
| Maximum value of tan δ at the peak temperature of tan δ which appears at the lowest temperature | | | 1.21 | 1.12 | 1.01 |
| Loss factor at 10° C. around 6300 Hz | | | 0.28 | 0.24 | 0.22 |
| Loss factor at 20° C. around 6300 Hz | | | 0.34 | 0.27 | 0.27 |
| Loss factor at 30° C. around 6300 Hz | | | 0.18 | 0.13 | 0.14 |
| Loss factor at 40° C. around 6300 Hz | | | 0.1 | 0.05 | 0.07 |

TABLE 2

| | | | Ex. 2 | Ex. 3 | Ex. 4 | Ex. 5 | Ex. 6 | Ex. 7 |
|---|---|---|---|---|---|---|---|---|
| Surface layer C | Resin | Kind | c | c | c | c | c | c |
| | | Butyralization degree (mol %) | 68.5 | 68.5 | 68.5 | 68.5 | 68.5 | 68.5 |
| | | Acetylation degree (mol %) | 1 | 1 | 1 | 1 | 1 | 1 |
| | | Hydroxy group content (mol %) | 30.5 | 30.5 | 30.5 | 30.5 | 30.5 | 30.5 |
| | | Amount | 100 | 100 | 100 | 100 | 100 | 100 |
| | Plasticizer | Kind | 3GO | 3GO | 3GO | 3GO | 3GO | 3GO |
| | | Amount | 36 | 36 | 35.5 | 35.5 | 35.5 | 34.5 |
| Intermediate layer A | Resin | Kind | a | a | a | a | a | a |
| | | Butyralization degree (mol %) | 54 | 54 | 54 | 54 | 54 | 54 |
| | | Acetylation degree (mol %) | 21 | 21 | 21 | 21 | 21 | 21 |
| | | Hydroxy group content (mol %) | 25 | 25 | 25 | 25 | 25 | 25 |
| | | Amount | 100 | 100 | 100 | 100 | 100 | 100 |
| | Plasticizer | Kind | 3GO | 3GO | 3GO | 3GO | 3GO | 3GO |
| | | Amount | 60 | 60 | 60 | 60 | 60 | 60 |

TABLE 2-continued

|  |  |  | Ex. 2 | Ex. 3 | Ex. 4 | Ex. 5 | Ex. 6 | Ex. 7 |
|---|---|---|---|---|---|---|---|---|
| Intermediate layer B | Resin | Kind | b | b | b | b | b | d |
|  |  | Butyralization degree (mol %) | 56 | 56 | 56 | 56 | 56 | 64 |
|  |  | Acetylation degree (mol %) | 13 | 13 | 13 | 13 | 13 | 23 |
|  |  | Hydroxy group content (mol %) | 31 | 31 | 31 | 31 | 31 | 13 |
|  |  | Amount | 100 | 100 | 100 | 100 | 100 | 100 |
|  | Plasticizer | Kind | 3GO | 3GO | 3GO | 3GO | 3GO | 3GO |
|  |  | Amount | 50 | 50 | 50 | 50 | 50 | 50 |
| Surface layer C | Resin | Kind | c | c | c | c | c | c |
|  |  | Butyralization degree (mol %) | 68.5 | 68.5 | 68.5 | 68.5 | 68.5 | 68.5 |
|  |  | Acetylation degree (mol %) | 1 | 1 | 1 | 1 | 1 | 1 |
|  |  | Hydroxy group content (mol %) | 30.5 | 30.5 | 30.5 | 30.5 | 30.5 | 30.5 |
|  |  | Amount | 100 | 100 | 100 | 100 | 100 | 100 |
|  | Plasticizer | Kind | 3GO | 3GO | 3GO | 3GO | 3GO | 3GO |
|  |  | Amount | 36 | 36 | 35.5 | 35.5 | 35.5 | 34.5 |
| Amount of all the plasticizers contained in the interlayer film based on 100 parts by weight of all the polyvinyl acetal resins contained in the interlayer film (parts by weight) |  |  | 38.6 | 38.3 | 39.6 | 39.3 | 38.9 | 37.6 |
| Configuration of film |  |  | C/A/B/C | C/A/B/C | C/A/B/C | C/A/B/C | C/A/B/C | C/A/B/C |
| Thickness of surface layer C (μm)/intermediate layer A (μm)/ intermediate layer B (μm)/surface layer C (μm) |  |  | 375/60/ 60/375 | 375/40/ 80/375 | 375/120/ 60/375 | 375/90/ 90/375 | 375/60/ 120/375 | 375/80/ 40/375 |
| Cloud point (° C.) measured by using the polyvinyl acetal resin and the plasticizer contained in the intermediate layer A |  |  | −14 | −14 | −14 | −14 | −14 | −14 |
| Cloud point (° C.) measured by using the polyvinyl acetal resin and the plasticizer contained in the intermediate layer B |  |  | 55 | 55 | 55 | 55 | 55 | 18 |
| Cloud point (° C.) measured by using the polyvinyl acetal resin and the plasticizer contained in the surface layer C |  |  | 124 | 124 | 124 | 124 | 124 | 124 |
| Total thickness of the intermediate layer(s) (μm)/total thickness of the surface layers (μm) |  |  | 0.16 | 0.16 | 0.24 | 0.24 | 0.24 | 0.16 |
| Peak temperature (° C.) of tan δ which appears at the lowest temperature |  |  | −5.6 | −3.1 | −8 | −5.9 | −4.2 | −6.4 |
| Maximum value of tan δ at the peak temperature of tan δ which appears at the lowest temperature |  |  | 1.18 | 1.2 | 1.26 | 1.24 | 1.21 | 1.25 |
| Loss factor at 10° C. around 6300 Hz |  |  | 0.27 | 0.25 | 0.31 | 0.28 | 0.26 | 0.3 |
| Loss factor at 20° C. around 6300 Hz |  |  | 0.35 | 0.33 | 0.3 | 0.36 | 0.34 | 0.36 |
| Loss factor at 30° C. around 6300 Hz |  |  | 0.19 | 0.23 | 0.17 | 0.22 | 0.25 | 0.2 |
| Loss factor at 40° C. around 6300 Hz |  |  | 0.11 | 0.12 | 0.1 | 0.12 | 0.13 | 0.1 |

TABLE 3

|  |  |  | Ex. 8 | Ex. 9 | Ex. 10 | Ex. 11 | Ex. 12 |
|---|---|---|---|---|---|---|---|
| Surface layer C | Resin | Kind | c | c | c | c | c |
|  |  | Butyralization degree (mol %) | 68.5 | 68.5 | 68.5 | 68.5 | 68.5 |
|  |  | Acetylation degree (mol %) | 1 | 1 | 1 | 1 | 1 |
|  |  | Hydroxy group content (mol %) | 30.5 | 30.5 | 30.5 | 30.5 | 30.5 |
|  |  | Amount | 100 | 100 | 100 | 100 | 100 |
|  | Plasticizer | Kind | 3GO | 3GO | 3GO | 3GO | 3GO |
|  |  | Amount | 34.5 | 34.5 | 34 | 34 | 34 |
| Intermediate layer A | Resin | Kind | a | a | a | a | a |
|  |  | Butyralization degree (mol %) | 54 | 54 | 54 | 54 | 54 |
|  |  | Acetylation degree (mol %) | 21 | 21 | 21 | 21 | 21 |
|  |  | Hydroxy group content (mol %) | 25 | 25 | 25 | 25 | 25 |
|  |  | Amount | 100 | 100 | 100 | 100 | 100 |
|  | Plasticizer | Kind | 3GO | 3GO | 3GO | 3GO | 3GO |
|  |  | Amount | 60 | 60 | 60 | 60 | 60 |
| Intermediate layer B | Resin | Kind | d | d | d | d | d |
|  |  | Butyralization degree (mol %) | 64 | 64 | 64 | 64 | 64 |
|  |  | Acetylation degree (mol %) | 23 | 23 | 23 | 23 | 23 |
|  |  | Hydroxy group content (mol %) | 13 | 13 | 13 | 13 | 13 |
|  |  | Amount | 100 | 100 | 100 | 100 | 100 |
|  | Plasticizer | Kind | 3GO | 3GO | 3GO | 3GO | 3GO |
|  |  | Amount | 50 | 50 | 50 | 50 | 50 |
| Surface layer C | Resin | Kind | c | c | c | c | c |
|  |  | Butyralization degree (mol %) | 68.5 | 68.5 | 68.5 | 68.5 | 68.5 |
|  |  | Acetylation degree (mol %) | 1 | 1 | 1 | 1 | 1 |
|  |  | Hydroxy group content (mol %) | 30.5 | 30.5 | 30.5 | 30.5 | 30.5 |
|  |  | Amount | 100 | 100 | 100 | 100 | 100 |
|  | Plasticizer | Kind | 3GO | 3GO | 3GO | 3GO | 3GO |
|  |  | Amount | 34.5 | 34.5 | 34 | 34 | 34 |
| Amount of all the plasticizers contained in the interlayer film based on 100 parts by weight of all the polyvinyl acetal resins contained in the interlayer film (parts by weight) |  |  | 37.3 | 37.1 | 38.4 | 38.1 | 37.7 |
| Configuration of film |  |  | C/A/B/C | C/A/B/C | C/A/B/C | C/A/B/C | C/A/B/C |
| Thickness of surface layer C (μm)/intermediate layer A (μm)/ intermediate layer B (μm)/surface layer C (μm) |  |  | 375/60/ 60/375 | 375/40/ 80/375 | 375/120/ 60/375 | 375/90/ 90/375 | 375/60/ 120/375 |

TABLE 3-continued

|  | Ex. 8 | Ex. 9 | Ex. 10 | Ex. 11 | Ex. 12 |
|---|---|---|---|---|---|
| Cloud point (° C.) measured by using the polyvinyl acetal resin and the plasticizer contained in the intermediate layer A | −14 | −14 | −14 | −14 | −14 |
| Cloud point (° C.) measured by using the polyvinyl acetal resin and the plasticizer contained in the intermediate layer B | 18 | 18 | 18 | 18 | 18 |
| Cloud point (° C.) measured by using the polyvinyl acetal resin and the plasticizer contained in the surface layer C | 124 | 124 | 124 | 124 | 124 |
| Total thickness of the intermediate layer(s) (μm)/total thickness of the surface layers (μm) | 0.16 | 0.16 | 0.24 | 0.24 | 0.24 |
| Peak temperature (° C.) of tan δ which appears at the lowest temperature | −4.8 | −2.4 | −7.1 | −5.3 | −3.6 |
| Maximum value of tan δ at the peak temperature of tan δ which appears at the lowest temperature | 1.22 | 1.2 | 1.33 | 1.28 | 1.24 |
| Loss factor at 10° C. around 6300 Hz | 0.28 | 0.24 | 0.32 | 0.28 | 0.26 |
| Loss factor at 20° C. around 6300 Hz | 0.34 | 0.33 | 0.31 | 0.36 | 0.35 |
| Loss factor at 30° C. around 6300 Hz | 0.24 | 0.27 | 0.19 | 0.24 | 0.26 |
| Loss factor at 40° C. around 6300 Hz | 0.12 | 0.13 | 0.11 | 0.12 | 0.14 |

TABLE 4

|  |  |  | Ex. 13 | Ex. 14 | Ex. 15 | Ex. 16 | Ex. 17 | Ex. 18 |
|---|---|---|---|---|---|---|---|---|
| Surface layer C | Resin | Kind | c | c | c | c | c | c |
|  |  | Butyralization degree (mol %) | 68.5 | 68.5 | 68.5 | 68.5 | 68.5 | 68.5 |
|  |  | Acetylation degree (mol %) | 1 | 1 | 1 | 1 | 1 | 1 |
|  |  | Hydroxy group content (mol %) | 30.5 | 30.5 | 30.5 | 30.5 | 30.5 | 30.5 |
|  |  | Amount | 100 | 100 | 100 | 100 | 100 | 100 |
|  | Plasticizer | Kind | 3GO | 3GO | 3GO | 3GO | 3GO | 3GO |
|  |  | Amount | 30 | 30 | 30 | 30 | 30 | 30 |
| Intermediate layer A | Resin | Kind | e | e | e | e | e | e |
|  |  | Butyralization degree (mol %) | 45 | 45 | 45 | 45 | 45 | 45 |
|  |  | Acetylation degree (mol %) | 40 | 40 | 40 | 40 | 40 | 40 |
|  |  | Hydroxy group content (mol %) | 15 | 15 | 15 | 15 | 15 | 15 |
|  |  | Amount | 100 | 100 | 100 | 100 | 100 | 100 |
|  | Plasticizer | Kind | 3GO | 3GO | 3GO | 3GO | 3GO | 3GO |
|  |  | Amount | 40 | 40 | 40 | 40 | 40 | 40 |
| Intermediate layer B | Resin | Kind | b | b | b | b | b | b |
|  |  | Butyralization degree (mol %) | 56 | 56 | 56 | 56 | 56 | 56 |
|  |  | Acetylation degree (mol %) | 13 | 13 | 13 | 13 | 13 | 13 |
|  |  | Hydroxy group content (mol %) | 31 | 31 | 31 | 31 | 31 | 31 |
|  |  | Amount | 100 | 100 | 100 | 100 | 100 | 100 |
|  | Plasticizer | Kind | 3GO | 3GO | 3GO | 3GO | 3GO | 3GO |
|  |  | Amount | 50 | 50 | 50 | 50 | 50 | 50 |
| Surface layer C | Resin | Kind | c | c | c | c | c | c |
|  |  | Butyralization degree (mol %) | 68.5 | 68.5 | 68.5 | 68.5 | 68.5 | 68.5 |
|  |  | Acetylation degree (mol %) | 1 | 1 | 1 | 1 | 1 | 1 |
|  |  | Hydroxy group content (mol %) | 30.5 | 30.5 | 30.5 | 30.5 | 30.5 | 30.5 |
|  |  | Amount | 100 | 100 | 100 | 100 | 100 | 100 |
|  | Plasticizer | Kind | 3GO | 3GO | 3GO | 3GO | 3GO | 3GO |
|  |  | Amount | 30 | 30 | 30 | 30 | 30 | 30 |
| Amount of all the plasticizers contained in the interlayer film based on 100 parts by weight of all the polyvinyl acetal resins contained in the interlayer film (parts by weight) |  |  | 31.8 | 32.1 | 32.3 | 32.6 | 32.9 | 33.2 |
| Configuration of film |  |  | C/A/B/C | C/A/B/C | C/A/B/C | C/A/B/C | C/A/B/C | C/A/B/C |
| Thicknesses of surface layer C (μm)/intermediate layer A (μm)/intermediate layer B (μm)/surface layer C (μm) |  |  | 375/80/40/375 | 375/60/60/375 | 375/40/80/375 | 375/120/60/375 | 375/90/90/375 | 375/60/120/375 |
| Cloud point (° C.) measured by using the polyvinyl acetal resin and the plasticizer contained in the intermediate layer A |  |  | Flow point or lower | Flow point or lower | Flow point or lower | Flow point or lower | Flow point or lower | Flow point or lower |
| Cloud point (° C.) measured by using the polyvinyl acetal resin and the plasticizer contained in the intermediate layer B |  |  | 55 | 55 | 55 | 55 | 55 | 55 |
| Cloud point (° C.) measured by using the polyvinyl acetal resin and the plasticizer contained in the surface layer C |  |  | 124 | 124 | 124 | 124 | 124 | 124 |
| Total thickness of the intermediate layer(s) (μm)/total thickness of the surface layers (μm) |  |  | 0.16 | 0.16 | 0.16 | 0.24 | 0.24 | 0.24 |
| Peak temperature (° C.) of tan δ which appears at the lowest temperature |  |  | −6.4 | −4.2 | −2.7 | −7.3 | −5.2 | −4.1 |
| Maximum value of tan δ at the peak temperature of tan δ which appears at the lowest temperature |  |  | 1.43 | 1.38 | 1.35 | 1.48 | 1.42 | 1.36 |
| Loss factor at 10° C. around 6300 Hz |  |  | 0.3 | 0.28 | 0.25 | 0.32 | 0.31 | 0.31 |
| Loss factor at 20° C. around 6300 Hz |  |  | 0.38 | 0.4 | 0.37 | 0.37 | 0.4 | 0.42 |
| Loss factor at 30° C. around 6300 Hz |  |  | 0.26 | 0.3 | 0.33 | 0.28 | 0.3 | 0.32 |
| Loss factor at 40° C. around 6300 Hz |  |  | 0.12 | 0.14 | 0.16 | 0.13 | 0.14 | 0.15 |

TABLE 5

|  |  |  | Ex. 19 | Ex. 20 | Ex. 21 | Ex. 22 | Ex. 23 | Ex. 24 |
|---|---|---|---|---|---|---|---|---|
| Surface layer C | Resin | Kind | c | c | c | c | c | c |
|  |  | Butyralization degree (mol %) | 68.5 | 68.5 | 68.5 | 68.5 | 68.5 | 68.5 |
|  |  | Acetylation degree (mol %) | 1 | 1 | 1 | 1 | 1 | 1 |
|  |  | Hydroxy group content (mol %) | 30.5 | 30.5 | 30.5 | 30.5 | 30.5 | 30.5 |
|  |  | Amount | 100 | 100 | 100 | 100 | 100 | 100 |
|  | Plasticizer | Kind | 3GO | 3GO | 3GO | 3GO | 3GO | 3GO |
|  |  | Amount | 30 | 30 | 30 | 30 | 30 | 30 |
| Intermediate layer A | Resin | Kind | e | e | e | e | e | e |
|  |  | Butyralization degree (mol %) | 45 | 45 | 45 | 45 | 45 | 45 |
|  |  | Acetylation degree (mol %) | 40 | 40 | 40 | 40 | 40 | 40 |
|  |  | Hydroxy group content (mol %) | 15 | 15 | 15 | 15 | 15 | 15 |
|  |  | Amount | 100 | 100 | 100 | 100 | 100 | 100 |
|  | Plasticizer | Kind | 3GO | 3GO | 3GO | 3GO | 3GO | 3GO |
|  |  | Amount | 40 | 40 | 40 | 40 | 40 | 40 |
| Intermediate layer B | Resin | Kind | d | d | d | d | d | d |
|  |  | Butyralization degree (mol %) | 64 | 64 | 64 | 64 | 64 | 64 |
|  |  | Acetylation degree (mol %) | 23 | 23 | 23 | 23 | 23 | 23 |
|  |  | Hydroxy group content (mol %) | 13 | 13 | 13 | 13 | 13 | 13 |
|  |  | Amount | 100 | 100 | 100 | 100 | 100 | 100 |
|  | Plasticizer | Kind | 3GO | 3GO | 3GO | 3GO | 3GO | 3GO |
|  |  | Amount | 50 | 50 | 50 | 50 | 50 | 50 |
| Surface layer C | Resin | Kind | c | c | c | c | c | c |
|  |  | Butyralization degree (mol %) | 68.5 | 68.5 | 68.5 | 68.5 | 68.5 | 68.5 |
|  |  | Acetylation degree (mol %) | 1 | 1 | 1 | 1 | 1 | 1 |
|  |  | Hydroxy group content (mol %) | 30.5 | 30.5 | 30.5 | 30.5 | 30.5 | 30.5 |
|  |  | Amount | 100 | 100 | 100 | 100 | 100 | 100 |
|  | Plasticizer | Kind | 3GO | 3GO | 3GO | 3GO | 3GO | 3GO |
|  |  | Amount | 30 | 30 | 30 | 30 | 30 | 30 |
| Amount of all the plasticizers contained in the interlayer film based on 100 parts by weight of all the polyvinyl acetal resins contained in the interlayer film (parts by weight) | | | 31.8 | 32.1 | 32.3 | 32.6 | 32.9 | 33.2 |
| Configuration of film | | | C/A/B/C | C/A/B/C | C/A/B/C | C/A/B/C | C/A/B/C | C/A/B/C |
| Thickness of surface layer C (μm)/intermediate layer A (μm)/intermediate layer B (μm)/surface layer C (μm) | | | 375/80/40/375 | 375/60/60/375 | 375/40/80/375 | 375/120/60/375 | 375/90/90/375 | 375/60/120/375 |
| Cloud point (° C.) measured by using the polyvinyl acetal resin and the plasticizer contained in the intermediate layer A | | | Flow point or lower | Flow point or lower | Flow point or lower | Flow point or lower | Flow point or lower | Flow point or lower |
| Cloud point (° C.) measured by using the polyvinyl acetal resin and the plasticizer contained in the intermediate layer B | | | 18 | 18 | 18 | 18 | 18 | 18 |
| Cloud point (° C.) measured by using the polyvinyl acetal resin and the plasticizer contained in the surface layer C | | | 124 | 124 | 124 | 124 | 124 | 124 |
| Total thickness of the intermediate layer(s) (μm)/total thickness of the surface layers (μm) | | | 0.16 | 0.16 | 0.16 | 0.24 | 0.24 | 0.24 |
| Peak temperature (° C.) of tan δ which appears at the lowest temperature | | | −5.9 | −3.8 | −2.2 | −6.5 | −5.8 | −4.6 |
| Maximum value of tan δ at the peak temperature of tan δ which appears at the lowest temperature | | | 1.44 | 1.4 | 1.36 | 1.48 | 1.43 | 1.38 |
| Loss factor at 10° C. around 6300 Hz | | | 0.31 | 0.3 | 0.28 | 0.31 | 0.3 | 0.3 |
| Loss factor at 20° C. around 6300 Hz | | | 0.38 | 0.4 | 0.38 | 0.38 | 0.38 | 0.38 |
| Loss factor at 30° C. around 6300 Hz | | | 0.31 | 0.32 | 0.34 | 0.31 | 0.33 | 0.35 |
| Loss factor at 40° C. around 6300 Hz | | | 0.11 | 0.12 | 0.14 | 0.12 | 0.13 | 0.14 |

TABLE 6

|  |  |  | Ex. 25 | Ex. 26 | EX. 27 | Ex. 28 | Ex. 29 | Ex. 30 |
|---|---|---|---|---|---|---|---|---|
| Surface layer C | Resin | Kind | c | c | c | c | c | c |
|  |  | Butyralization degree (mol %) | 68.5 | 68.5 | 68.5 | 68.5 | 68.5 | 68.5 |
|  |  | Acetylation degree (mol %) | 1 | 1 | 1 | 1 | 1 | 1 |
|  |  | Hydroxy group content (mol %) | 30.5 | 30.5 | 30.5 | 30.5 | 30.5 | 30.5 |
|  |  | Amount | 100 | 100 | 100 | 100 | 100 | 100 |
|  | Plasticizer | Kind | 3GO | 3GO | 3GO | 3GO | 3GO | 3GO |
|  |  | Amount | 30 | 30 | 30 | 30 | 30 | 30 |
| Intermediate layer A | Resin | Kind | e | e | e | e | e | e |
|  |  | Butyralization degree (mol %) | 45 | 45 | 45 | 45 | 45 | 45 |
|  |  | Acetylation degree (mol %) | 40 | 40 | 40 | 40 | 40 | 40 |
|  |  | Hydroxy group content (mol %) | 15 | 15 | 15 | 15 | 15 | 15 |
|  |  | Amount | 100 | 100 | 100 | 100 | 100 | 100 |
|  | Plasticizer | Kind | 3GO | 3GO | 3GO | 3GO | 3GO | 3GO |
|  |  | Amount | 40 | 40 | 40 | 40 | 40 | 40 |
| Intermediate layer B | Resin | Kind | a | a | a | a | a | a |
|  |  | Butyralization degree (mol %) | 54 | 54 | 54 | 54 | 54 | 54 |
|  |  | Acetylation degree (mol %) | 21 | 21 | 21 | 21 | 21 | 21 |
|  |  | Hydroxy group content (mol %) | 25 | 25 | 25 | 25 | 25 | 25 |
|  |  | Amount | 100 | 100 | 100 | 100 | 100 | 100 |
|  | Plasticizer | Kind | 3GO | 3GO | 3GO | 3GO | 3GO | 3GO |
|  |  | Amount | 40 | 40 | 40 | 40 | 40 | 40 |

TABLE 6-continued

|  |  |  | Ex. 25 | Ex. 26 | EX. 27 | Ex. 28 | Ex. 29 | Ex. 30 |
|---|---|---|---|---|---|---|---|---|
| Surface layer C | Resin | Kind | c | c | c | c | c | c |
|  |  | Butyralization degree (mol %) | 68.5 | 68.5 | 68.5 | 68.5 | 68.5 | 68.5 |
|  |  | Acetylation degree (mol %) | 1 | 1 | 1 | 1 | 1 | 1 |
|  |  | Hydroxy group content (mol %) | 30.5 | 30.5 | 30.5 | 30.5 | 30.5 | 30.5 |
|  |  | Amount | 100 | 100 | 100 | 100 | 100 | 100 |
|  | Plasticizer | Kind | 3GO | 3GO | 3GO | 3GO | 3GO | 3GO |
|  |  | Amount | 30 | 30 | 30 | 30 | 30 | 30 |
| Amount of all the plasticizers contained in the interlayer film based on 100 parts by weight of all the polyvinyl acetal resins contained in the interlayer film (parts by weight) |  |  | 31.3 | 31.4 | 31.4 | 31.9 | 31.9 | 31.9 |
| Configuration of film |  |  | C/A/B/C | C/A/B/C | C/A/B/C | C/A/B/C | C/A/B/C | C/A/B/C |
| Thickness of surface layer C (μm)/intermediate layer A (μm)/ intermediate layer B (μm)/surface layer C (μm) |  |  | 375/80/ 40/375 | 375/60/ 60/375 | 375/40/ 80/375 | 375/120/ 60/375 | 375/90/ 90/375 | 376/60/ 120/375 |
| Cloud point (° C.) measured by using the polyvinyl acetal resin and the plasticizer contained in the intermediate layer A |  |  | Flow point or lower | Flow point or lower | Flow point or lower | Flow point or lower | Flow point or lower | Flow point or lower |
| Cloud point (° C.) measured by using the polyvinyl acetal resin and the plasticizer contained in the intermediate layer B |  |  | −14 | −14 | −14 | −14 | −14 | −14 |
| Cloud point (° C.) measured by using the polyvinyl acetal resin and the plasticizer contained in the surface layer C |  |  | 124 | 124 | 124 | 124 | 124 | 124 |
| Total thickness of the intermediate layer(s) (μm)/total thickness of the surface layers (μm) |  |  | 0.16 | 0.16 | 0.16 | 0.24 | 0.24 | 0.24 |
| Peak temperature (° C.) of tan δ which appears at the lowest temperature |  |  | −4.1 | −2.9 | −0.6 | −5.3 | −3.4 | −1.7 |
| Maximum value of tan δ at the peak temperature of tan δ which appears at the lowest temperature |  |  | 1.44 | 1.41 | 1.38 | 1.49 | 1.45 | 1.4 |
| Loss factor at 10° C. around 6300 Hz |  |  | 0.29 | 0.27 | 0.25 | 0.31 | 0.3 | 0.28 |
| Loss factor at 20° C. around 6300 Hz |  |  | 0.41 | 0.39 | 0.37 | 0.42 | 0.41 | 0.38 |
| Loss factor at 30° C. around 6300 Hz |  |  | 0.33 | 0.35 | 0.36 | 0.34 | 0.35 | 0.36 |
| Loss factor at 40° C. around 6300 Hz |  |  | 0.1 | 0.12 | 0.14 | 0.11 | 0.12 | 0.14 |

TABLE 7

|  |  |  | Ex. 31 | Ex. 32 | Ex. 33 |
|---|---|---|---|---|---|
| Surface layer C | Resin | Kind | c | c | c |
|  |  | Butyralization degree (mol %) | 68.5 | 68.5 | 68.5 |
|  |  | Acetylation degree (mol %) | 1 | 1 | 1 |
|  |  | Hydroxy group content (mol %) | 30.5 | 30.5 | 30.5 |
|  |  | Amount | 100 | 100 | 100 |
|  | Plasticizer | Kind | 3GB | 3GE | 3GE |
|  |  | Amount | 22 | 24 | 34 |
| Intermediate layer A | Resin | Kind | e | e | d |
|  |  | Butyralization degree (mol %) | 45 | 45 | 64 |
|  |  | Acetylation degree (mol %) | 40 | 40 | 23 |
|  |  | Hydroxy group content (mol %) | 15 | 15 | 13 |
|  |  | Amount | 100 | 100 | 100 |
|  | Plasticizer | Kind | 3GB | 3GE | 3GE |
|  |  | Amount | 40 | 40 | 50 |
| Intermediate layer B | Resin | Kind | d | d | b |
|  |  | Butyralization degree (mol %) | 64 | 64 | 56 |
|  |  | Acetylation degree (mol %) | 23 | 23 | 13 |
|  |  | Hydroxy group content (mol %) | 13 | 13 | 31 |
|  |  | Amount | 100 | 100 | 100 |
|  | Plasticizer | Kind | 3GB | 3GE | 3GE |
|  |  | Amount | 40 | 40 | 50 |
| Surface layer C | Resin | Kind | c | c | c |
|  |  | Butyralization degree (mol %) | 68.5 | 68.5 | 68.5 |
|  |  | Acetylation degree (mol %) | 1 | 1 | 1 |
|  |  | Hydroxy group content (mol %) | 30.5 | 30.5 | 30.5 |
|  |  | Amount | 100 | 100 | 100 |
|  | Plasticizer | Kind | 3GB | 3GE | 3GE |
|  |  | Amount | 22 | 24 | 34 |
| Amount of all the plasticizers contained in the interlayer film based on 100 parts by weight of all the polyvinyl acetal resins contained in the interlayer film (parts by weight) |  |  | 24.5 | 26.2 | 36.2 |
| Configuration of film |  |  | C/A/B/C | C/A/B/C | C/A/B/C |
| Thickness of surface layer C (μm)/intermediate layer A (μm)/ intermediate layer B (μm)/surface layer C (μm) |  |  | 375/80/ 40/375 | 375/80/ 40/375 | 375/80/ 40/375 |
| Cloud point (° C.) measured by using the polyvinyl acetal resin and the plasticizer contained in the intermediate layer A |  |  | Flow point or lower | Flow point or lower | −8 |
| Cloud point (° C.) measured by using the polyvinyl acetal resin and the plasticizer contained in the intermediate layer B |  |  | −10 | −8 | 22 |
| Cloud point (° C.) measured by using the polyvinyl acetal resin and the plasticizer contained in the surface layer C |  |  | 74 | 85 | 85 |
| Total thickness of the intermediate layer(s) (μm)/total thickness of the surface layers (μm) |  |  | 0.16 | 0.16 | 0.16 |

TABLE 7-continued

|  | Ex. 31 | Ex. 32 | Ex. 33 |
|---|---|---|---|
| Peak temperature (° C.) of tan δ which appears at the lowest temperature | −3.8 | −4 | −3.6 |
| Maximum value of tan δ at the peak temperature of tan δ which appears at the lowest temperature | 1.48 | 1.46 | 1.2 |
| Loss factor at 10° C. around 6300 Hz | 0.3 | 0.29 | 0.27 |
| Loss factor at 20° C. around 6300 Hz | 0.42 | 0.42 | 0.32 |
| Loss factor at 30° C. around 6300 Hz | 0.34 | 0.34 | 0.18 |
| Loss factor at 40° C. around 6300 Hz | 0.11 | 0.1 | 0.1 |

EXPLANATION OF SYMBOLS

1. First layer
1a. First surface
1b. Second surface
2. Second layer
2a. First surface
2b. Second surface
3. Third layer
3a. Outer surface
4. Fourth layer
4a. Outer surface
5. Interlayer film
5a. First surface
5b. Second surface
11. Laminated glass
21. First component for laminated glass
22. Second component for laminated glass
31. First layer
31a. First surface
31b. Second surface
32. Second layer
32a. First surface
32b. Second surface
33. Third layer
34. Fourth layer
35. Interlayer film
41. First layer
41a Outer surface
42. Second layer
42a. Outer surface
43. Third layer
43a. First surface
43b. Second surface
45. Interlayer film

The invention claimed is:

1. An interlayer film for laminated glass comprising:
a first layer containing a first polyvinyl acetal resin and a first plasticizer;
a second layer containing a second polyvinyl acetal resin and a second plasticizer; and
a third layer containing a third polyvinyl acetal resin and a third plasticizer,
wherein, when a cloud point C1 is measured by using a first liquid containing 8 parts by weight of the first polyvinyl acetal resin dissolved in 100 parts by weight of the first plasticizer, a cloud point C2 is measured by using a second liquid containing 8 parts by weight of the second polyvinyl acetal resin dissolved in 100 parts by weight of the second plasticizer. and a cloud point C3 is measured by using a third liquid containing 8 parts by weight of the third polyvinyl acetal resin dissolved in 100 parts by weight of the third plasticizer,
the cloud point C1 is 10° C. or lower;
the cloud point C2 is higher than the cloud point C1 by at least 5° C.; and
the cloud point C3 is higher than the cloud point C1 by at least 50° C. and higher than the cloud point C2.

2. The interlayer film for laminated glass according to claim 1,
wherein an acetylation deuce of the first polyvinyl acetal resin is higher than an acetylation degree of the second polyvinyl acetal resin and an acetylation degree of the third polyvinyl acetal resin.

3. The interlayer film for laminated glass according to claim 1,
wherein an acetylation degree of the third polyvinyl aceta.1 resin is lower than an acetylation degree of the first polyvinyl acetal resin and an acetylation degree of the second polyvinyl acetal resin.

4. The interlayer or laminated glass according to claim 1,
wherein an acetylation degree of the first polyvinyl acetal resin is not lower than 15 mol %,
an acetylation degree of the second polyvinyl acetal resin is not lower than 5 mol % but lower than 15 mol %, and
an acetylation degree of the third polyvinyl acetal resin is lower than 5 mol %.

5. The interlayer film for laminated glass according to claim 1,
wherein the amount of all the plasticizers contained in the interlayer film for laminated glass is 30 parts by weight or more and 50 parts by weight or less based on 100 parts by weight of all the polyvinyl acetal resins contained in the interlayer film for laminated glass.

6. The interlayer film for laminated glass according to claim 1,
wherein the first layer, the second layer, and the third layer are stacked to form a laminated structure, and
the layers are stacked in the order of the first layer, the second layer, and the third layer, the layers are stacked in the order of the second layer, the first layer, and the third layer, or the layers are stacked in the order of the first layer, the third layer, and the second layer.

7. The interlayer film for laminated glass according to claim 6,
wherein the first layer, the second layer, and the third layer are stacked to form a laminated structure, and
the layers are stacked in the order of the first layer, the second layer, and the third layer.

8. The interlayer film for laminated glass according to claim 1,
wherein a peak temperature of tanδ which appears at the lowest temperature measured at a frequency of 1 Hz is 0° C. or lower.

9. The interlayer film for laminated glass according to claim 1,
wherein a maximum value of tanδ at a peak temperature of tanδ measured at a frequency of 1 Hz which appears at the lowest temperature is 0.8 or more.

10. The interlayer film for laminated glass according to claim 1,
- wherein, when a thickness (mm) of the interlayer film for laminated glass is T, a total thickness (mm) of the first layer and the second layer is 0.05T or more and 0.4T or less.

11. The interlayer film for laminated glass according to claim 1, further comprising a fourth layer containing a fourth polyvinyl acetal resin and a fourth plasticizer,
- wherein, when a cloud point C4 is measured by using a fourth liquid containing 8 parts by weight of the fourth polyvinyl acetal resin dissolved in 100 parts by weight of the fourth plasticizer,
- the cloud point C4 is higher than the cloud point C1 by at least 50° C. and higher than the cloud point C2.

12. The interlayer film for laminated glass according to claim 11,
- wherein the layers are stacked in the order of the fourth layer, the first layer, the second layer, and the third layer.

13. The interlayer film for laminated glass according to claim 11,
- wherein a ratio of a total thickness of the first layer and the second layer to the total thickness of the third layer and the fourth layer is 0.1 or more and 0.5 or less.

14. A laminated glass comprising:
- a first component for laminated glass:
- a second component for laminated glass; and
- an interlayer film sandwiched between the first component for laminated glass and the second component for laminated glass,
- wherein the interlayer film is the interlayer film for laminated glass according to claim 1.

* * * * *